(12) United States Patent
Sudo

(10) Patent No.: US 11,770,213 B2
(45) Date of Patent: Sep. 26, 2023

(54) FAILURE DETECTION APPARATUS AND METHOD AND NON-TRANSITORY COMPUTER-READABLE STORAGE MEDIUM

(71) Applicant: KABUSHIKI KAISHA TOSHIBA, Tokyo (JP)

(72) Inventor: Takashi Sudo, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 17/412,418

(22) Filed: Aug. 26, 2021

(65) Prior Publication Data

US 2022/0200731 A1 Jun. 23, 2022

(30) Foreign Application Priority Data

Dec. 17, 2020 (JP) ................. 2020-209260

(51) Int. Cl.
| | |
|---|---|
| *H04R 3/00* | (2006.01) |
| *H04L 1/04* | (2006.01) |
| *H04L 43/067* | (2022.01) |
| *H04L 1/00* | (2006.01) |
| *H04L 1/1607* | (2023.01) |
| *H04R 29/00* | (2006.01) |

(52) U.S. Cl.
CPC .............. *H04L 1/04* (2013.01); *H04L 1/0045* (2013.01); *H04L 1/1678* (2013.01); *H04L 43/067* (2013.01); *H04R 3/00* (2013.01); *H04R 29/004* (2013.01)

(58) Field of Classification Search
CPC ....... H04L 1/04; H04L 1/0045; H04L 1/1678; H04L 43/067; H04R 3/00; H04R 29/004
USPC .............................................. 381/56, 58, 91
See application file for complete search history.

(56) References Cited

U.S. PATENT DOCUMENTS

| | | | | |
|---|---|---|---|---|
| 2009/0030693 A1* | 1/2009 | Shaffer | ................... | G10L 25/69 |
| | | | | 704/E11.004 |
| 2009/0268899 A1* | 10/2009 | Tokuda | ................ | H04R 29/005 |
| | | | | 379/420.02 |
| 2009/0303042 A1* | 12/2009 | Song | ..................... | G08B 25/009 |
| | | | | 340/541 |
| 2013/0329896 A1* | 12/2013 | Krishnaswamy | ........ | H04R 3/00 |
| | | | | 381/58 |
| 2016/0180830 A1* | 6/2016 | Lu | ..................... | G10K 11/17885 |
| | | | | 381/71.6 |
| 2020/0143605 A1 | 5/2020 | Kanishima et al. | | |

FOREIGN PATENT DOCUMENTS

| | | |
|---|---|---|
| JP | 2009278620 A | 11/2009 |
| JP | 2020077186 A | 5/2020 |

* cited by examiner

*Primary Examiner* — William A Jerez Lora
(74) *Attorney, Agent, or Firm* — Holtz, Holtz & Volek PC

(57) ABSTRACT

According to one embodiment, a failure detection apparatus includes processing circuitry. The processing circuitry acquires a time-series signal generated by a sensor module, generates an analysis result including information concerning saturation of the time-series signal by analyzing the time-series signal, and determine a failure of the sensor module based on the analysis result.

10 Claims, 16 Drawing Sheets

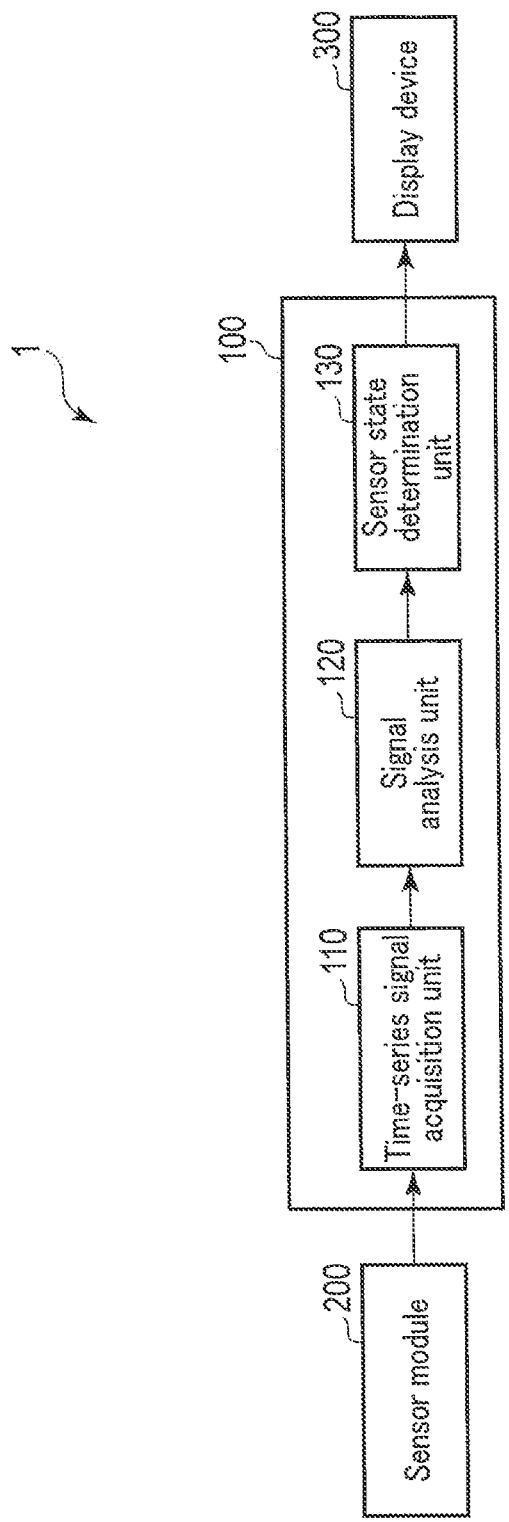
F I G. 1

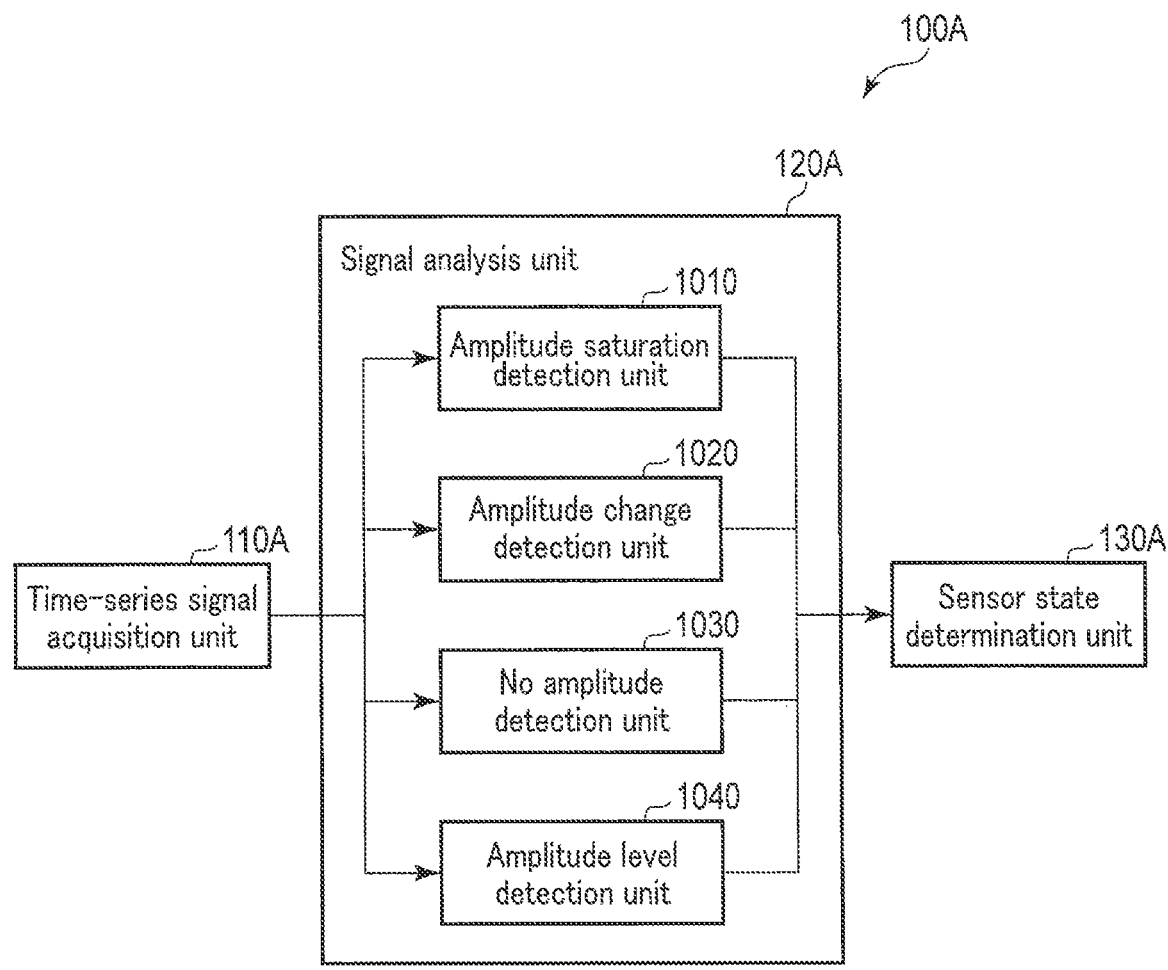
F I G. 10

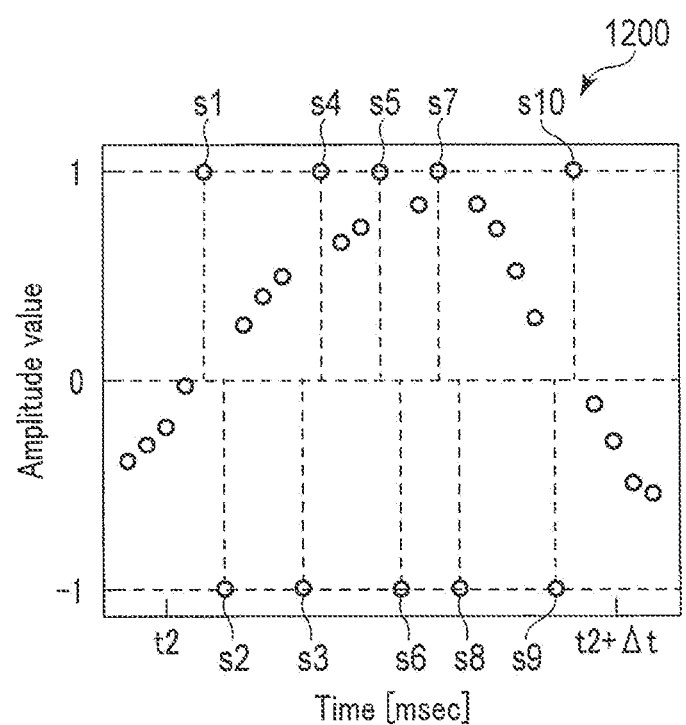
F I G. 12
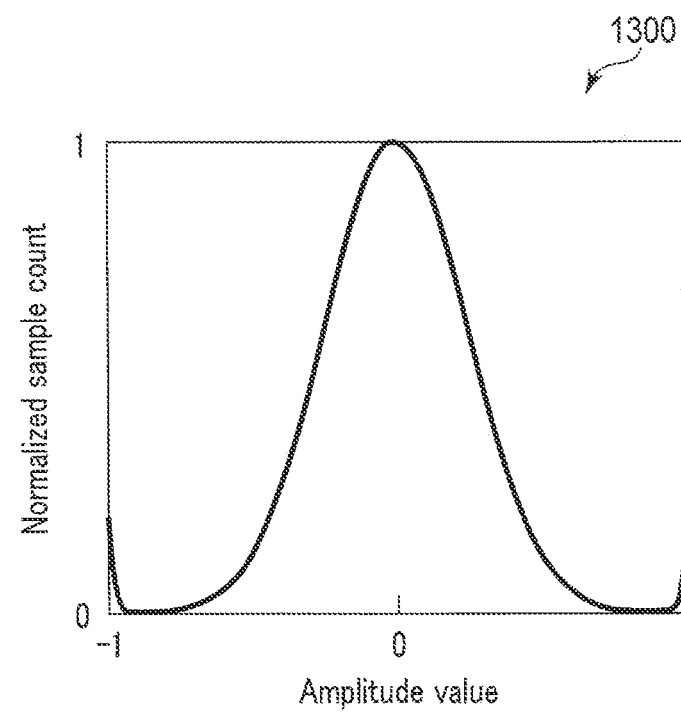
F I G. 13

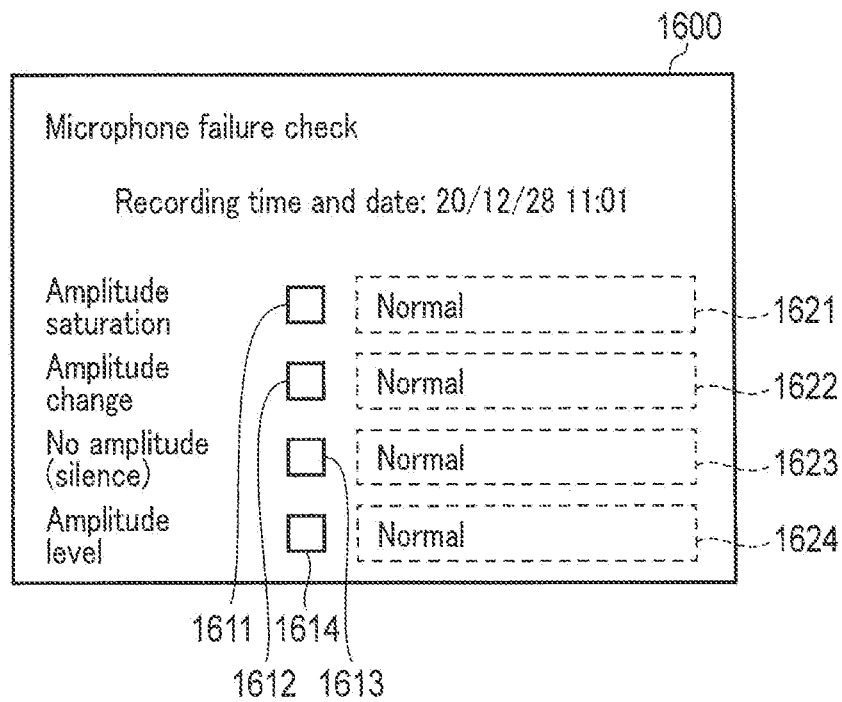
F I G. 16
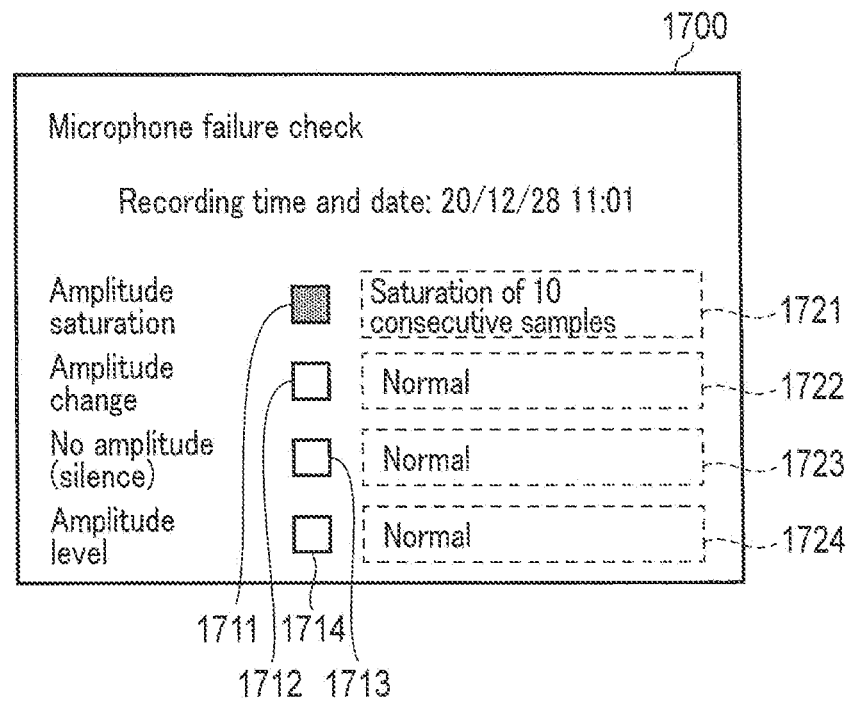
F I G. 17

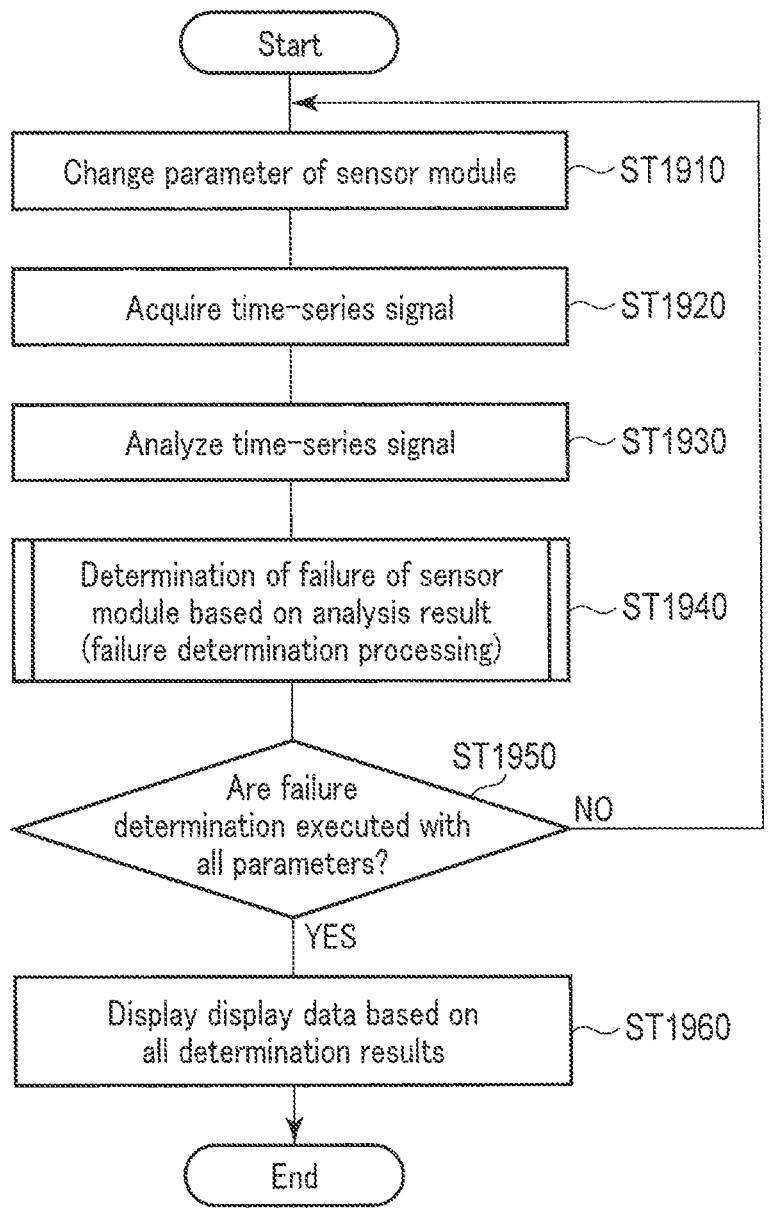
F I G. 19

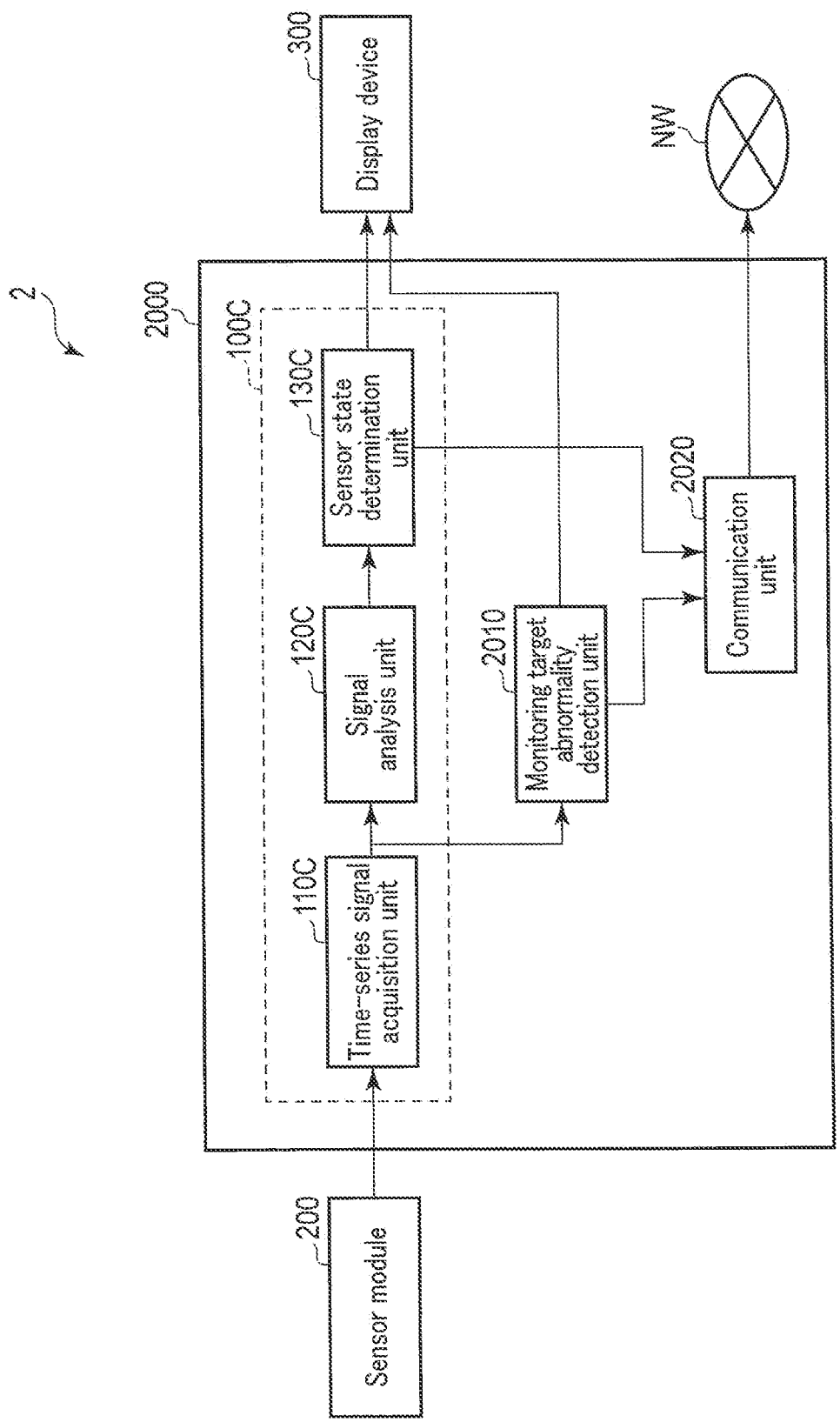
F I G. 20

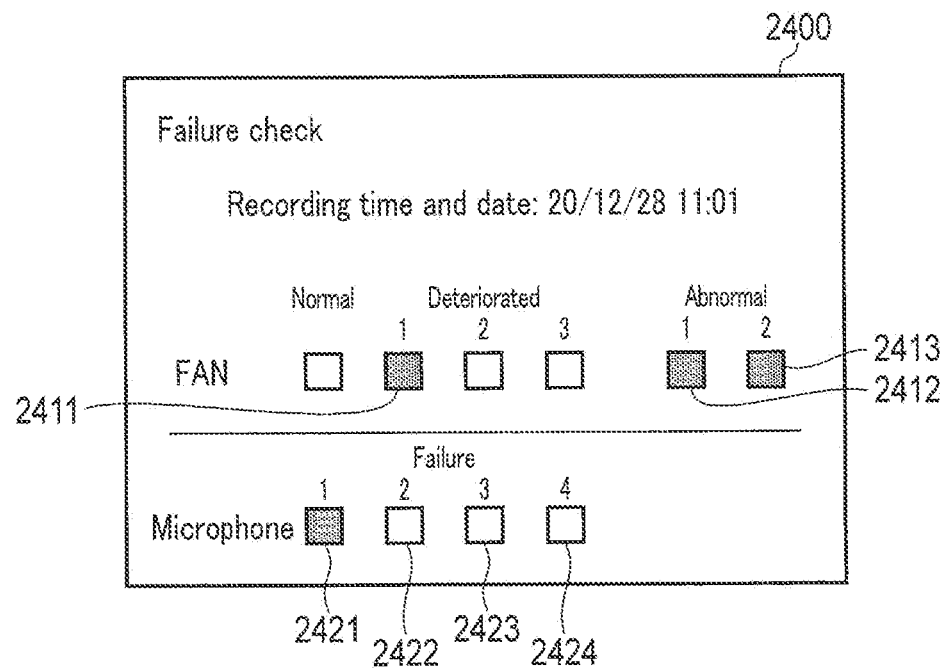
F I G. 24
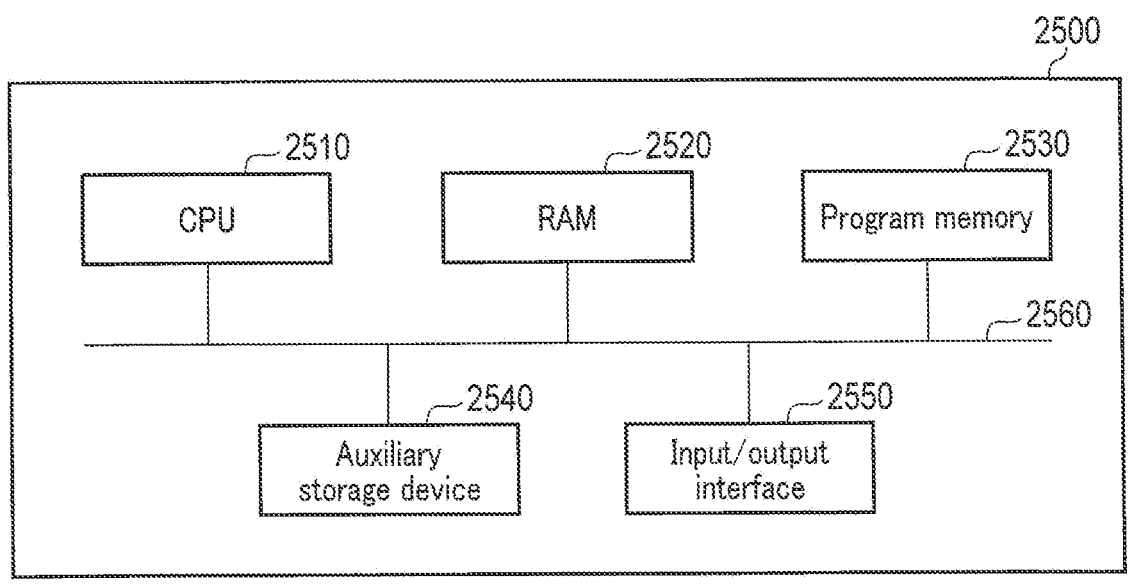
F I G. 25

FAILURE DETECTION APPARATUS AND METHOD AND NON-TRANSITORY COMPUTER-READABLE STORAGE MEDIUM

CROSS-REFERENCE TO RELATED APPLICATIONS

This application is based upon and claims the benefit of priority from Japanese Patent Application No. 2020-209260, filed Dec. 17, 2020, the entire contents of which are incorporated herein by reference.

FIELD

Embodiments described herein relate generally to a failure detection apparatus and method and a non-transitory computer-readable storage medium.

BACKGROUND

Conventionally, there is known a technique of detecting the failures of some microphones in an apparatus provided with a plurality of microphones. The above technique compares sound signal levels respectively output from a plurality of microphones to detect a microphone with a relatively low sound signal level and determine whether the microphone is in failure.

However, the above technique determines a failure when a sound signal level is low but gives no consideration to a failure when a sound signal level is high.

BRIEF DESCRIPTION OF THE DRAWINGS

FIG. 1 is a block diagram exemplarily showing the arrangement of a failure detection system including a failure detection apparatus according to the first embodiment;

FIG. 10 is a block diagram exemplarily showing the arrangement of a failure detection apparatus according to the second embodiment;

FIG. 12 is a graph exemplarily showing a steep change in time-series signal according to the second embodiment;

FIG. 13 is a graph exemplarily showing the amplitude histogram of a time-series signal according to the second embodiment;

FIG. 16 is a view exemplarily showing display data in a normal case according to the second embodiment;

FIG. 17 is a view exemplarily showing display data concerning the failure of a sensor module according to the second embodiment;

FIG. 19 is a flowchart exemplarily showing the operation of the failure detection apparatus in FIG. 18;

FIG. 20 is a block diagram exemplarily showing the arrangement of a state monitoring system including a state monitoring apparatus according to the fourth embodiment;

FIG. 24 is a view exemplarily showing display data concerning the failure of the sensor module and the abnormality of a monitoring target according to the fourth embodiment; and FIG. 25 is a block diagram exemplarily showing the hardware arrangement of a computer according to an embodiment.

DETAILED DESCRIPTION

In general, according to one embodiment, a failure detection apparatus includes processing circuitry. The processing circuitry acquires a time-series signal generated by a sensor module, generates an analysis result including information concerning saturation of the time-series signal by analyzing the time-series signal, and determine a failure of the sensor module based on the analysis result.

An embodiment related to a failure detection apparatus will be described in detail below with reference to the accompanying drawings.

First Embodiment

FIG. 1 is a block diagram exemplarily showing the arrangement of a failure detection system 1 including a failure detection apparatus 100 according to the first embodiment. The failure detection system 1 in FIG. 1 includes the failure detection apparatus 100, a sensor module 200, and a display device 300. The sensor module 200 generates sensor data concerning a measurement target. The measurement target is, for example, a cooling fan mounted in a permanent power supply. Alternatively, the measurement target may be a rotating device such as a motor or electric motor, a pressing machine, a shift engine, or a cutting machine. The failure detection apparatus 100 determines the state (normality or failure) of the sensor module 200 based on sensor data. The display device 300 displays display data based on the determination by the failure detection apparatus 100. Note that the failure detection system 1 may include a plurality of sensor modules. In this case, the failure detection apparatus 100 determines the state of each of the sensor modules.

Assume that this embodiment handles, as sensor data, a signal (time-series signal) including the sound waveform continuously measured by a microphone (microphone sensor). Accordingly, the following description is based on the assumption that the sensor module 200 is provided with a microphone sensor. Note that the sensor module 200 may be an acceleration sensor, geomagnetic sensor, vibration sensor, AE (Acoustic Emission) sensor, or the like as long as it acquires a time-series signal.

Figure 2:
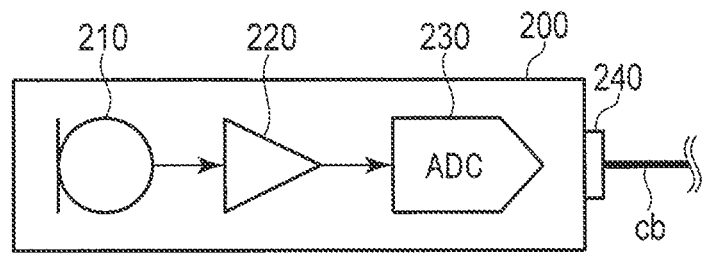
FIG. 2 is a block diagram exemplarily showing the arrangement of a sensor module in FIG. 1.

FIG. 2 is a block diagram exemplarily showing the arrangement of the sensor module 200 in FIG. 1. The sensor module 200 in FIG. 2 includes a microphone sensor 210, an amplifier 220, an ADC (Analog Digital Converter) 230, and a terminal 240.

The microphone sensor 210 is, for example, an ECM (Electret Condenser Microphone). The microphone sensor 210 collects sound data and converts the data into an analog sound signal. The microphone sensor 210 outputs the sound signal to the amplifier 220.

The amplifier 220 is, for example, an operation amplifier. The amplifier 220 receives the sound signal from the microphone sensor 210. The amplifier 220 generates an amplified sound signal by amplifying the sound signal in accordance with a predetermined gain. The amplifier 220 outputs the amplified sound signal to the ADC 230.

The ADC 230 receives the amplified sound signal from the amplifier 220. The ADC 230 performs analog/digital conversion (AD conversion) of the amplified analog sound signal to digital sound data (time-series signal). Parameters for AD conversion include, for example, a bit depth (quantization bit rate: for example, 24 bits) and a sampling rate (for example, 96 kHz). The ADC 230 outputs the time-series signal to the failure detection apparatus 100 via the terminal 240.

The terminal 240 connects the failure detection apparatus 100 to a cable cb. The cable cb connects the sensor module 200 to the failure detection apparatus 100. A plug or connector may be attached to one end of the cable cb. In this case, the plug or connector is fitted to the terminal 240 to connect the failure detection apparatus 100 to the cable cb.

Note that the microphone to be mounted in the sensor module 200 is not limited to an ECM. For example, a MEMS (Micro Electro Mechanical System) microphone may be used as the sensor module 200. When a MEMS microphone is to be used, the microphone sensor 210, the amplifier 220, and the ADC 230 may be formed into one chip.

In this embodiment, the recording level of the sensor module 200 is set in advance to acquire a time-series signal whose amplitude level is not saturated. In this embodiment, an amplitude level corresponds to the range from the minimum amplitude value of a time-series signal to the maximum amplitude value. In addition, the amplitude level being saturated indicates a state in which the time-series signal stops decreasing at the minimum amplitude value (underflows) or the time-series signal stops increasing at the maximum amplitude value (overflows). The recording level is set by, for example, the gain of the amplifier 220. Alternatively, the sensor module 200 is arranged at a position where it can acquire a time-series signal whose amplitude level is not saturated. For example, when the amplitude of a time-series signal is normalized to respectively set the maximum amplitude value and the minimum amplitude value to "1" and "−1", the recording level is set and arranged to fall between "−0.3" and "0.3". That is, in this embodiment, when a time-series signal whose amplitude level is saturated is acquired, it is determined that the sensor module 200 is in failure, and no consideration is given to abnormality (failure) concerning a measurement target (for example, a cooling fan). The same applies to the following embodiments.

Failures concerning the sensor module 200 include, for example, the failure of the microphone sensor 210, the failure of the amplifier 220, the failure of the ADC 230, and a defect in the terminal 240. Other failures include, for example, a bad electrical connection between the terminal 240 and a plug or connector and the disconnection of the cable cb. This embodiment is configured to detect failures concerning the sensor module 200. However, other failures may be considered as failure location candidates.

The failure detection apparatus 100 in FIG. 1 includes a time-series signal acquisition unit 110 (acquisition unit), a signal analysis unit 120 (analysis unit), and a sensor state determination unit 130 (determination unit).

The time-series signal acquisition unit 110 acquires a digital time-series signal from the sensor module 200. More specifically, the time-series signal acquisition unit 110 acquires a time-series signal having a predetermined time length at predetermined intervals. For example, the time-series signal acquisition unit 110 acquires a time-series signal having a length of 15 sec at intervals of 6 hr. The time-series signal acquisition unit 110 preferably acquires a time-series signal always in real time. The time-series signal acquisition unit 110 outputs the acquired time-series signal to the signal analysis unit 120. Assume that in the following description, the time-series signal acquisition unit 110 acquires a time-series signal having a length of 15 sec. Other cases will be described as needed.

In the following description, for the sake of simplicity, assume that the amplitude value of a time-series signal is normalized within the range from the minimum amplitude value "−1" to the maximum amplitude value "1" in accordance with the gain of the amplifier 220. Accordingly, when the amplitude value of a signal sample (to be simply referred to as a "sample" hereinafter) of a time-series signal indicates "1" or "−1", this time-series signal is regarded as a signal whose amplitude level is saturated upon clipping of the amplitude value by overflow or underflow.

The signal analysis unit 120 receives a time-series signal from the time-series signal acquisition unit 110. The signal analysis unit 120 generates an analysis result including information concerning the saturation of the time-series signal by analyzing the time-series signal. More specifically, the signal analysis unit 120 generates an analysis result including at least one of information concerning the number of times (consecutive saturation count) the amplitude values of samples included in the time-series signal are consecutively saturated and information concerning the frequency (amplitude saturation frequency) with which the amplitude values of samples included in the time-series signal are saturated. Accordingly, information concerning the saturation of a time-series signal includes at least one of information concerning a consecutive saturation count and information concerning an amplitude saturation frequency. The signal analysis unit 120 outputs the analysis result to the sensor state determination unit 130. Note that the signal analysis unit 120 may analyze a time-series signal in real time.

The sensor state determination unit 130 receives the analysis result from the signal analysis unit 120. The sensor state determination unit 130 determines the failure of the sensor module 200 based on the analysis result and generates a determination result. The determination result includes the state (failure or normality) of the sensor module 200. The sensor state determination unit 130 outputs the determination result to the display device 300.

More specifically, the sensor state determination unit 130 determines whether the consecutive saturation count included in the analysis result is equal to or more than a predetermined count. If the consecutive saturation count is equal to or more than the predetermined count, the sensor state determination unit 130 outputs a determination result indicating a failure; otherwise outputs a determination result indicating normality.

In another case, the sensor state determination unit 130 determines whether the amplitude saturation frequency included in the analysis result is equal to or more than a predetermined frequency. If the amplitude saturation frequency is equal to or more than the predetermined frequency, the sensor state determination unit 130 outputs a determination result indicating a failure; otherwise outputs a determination result indicating normality.

The display device 300 is, for example, a monitor. The display device 300 receives a determination result from the sensor state determination unit 130. The display device 300 displays display data corresponding to the state of the sensor module 200 which is included in the determination result. Note that the display device 300 may include a loudspeaker and may generate a warning when displaying a determination result indicating a failure.

Note that the sensor state determination unit 130 can be regarded to control the display operation of the display device 300 in accordance with a determination result. Accordingly, the sensor state determination unit 130 may also function as a display control unit that controls the display operation of the display device 300. Alternatively, the failure detection apparatus 100 may be provided with a display control unit independently of the sensor state determination unit 130.

The arrangements of the failure detection system 1 and the failure detection apparatus 100 according to the first embodiment have been described above. The operation of the failure detection apparatus 100 will be described next with reference to the flowchart of FIG. 3.

Figure 3:
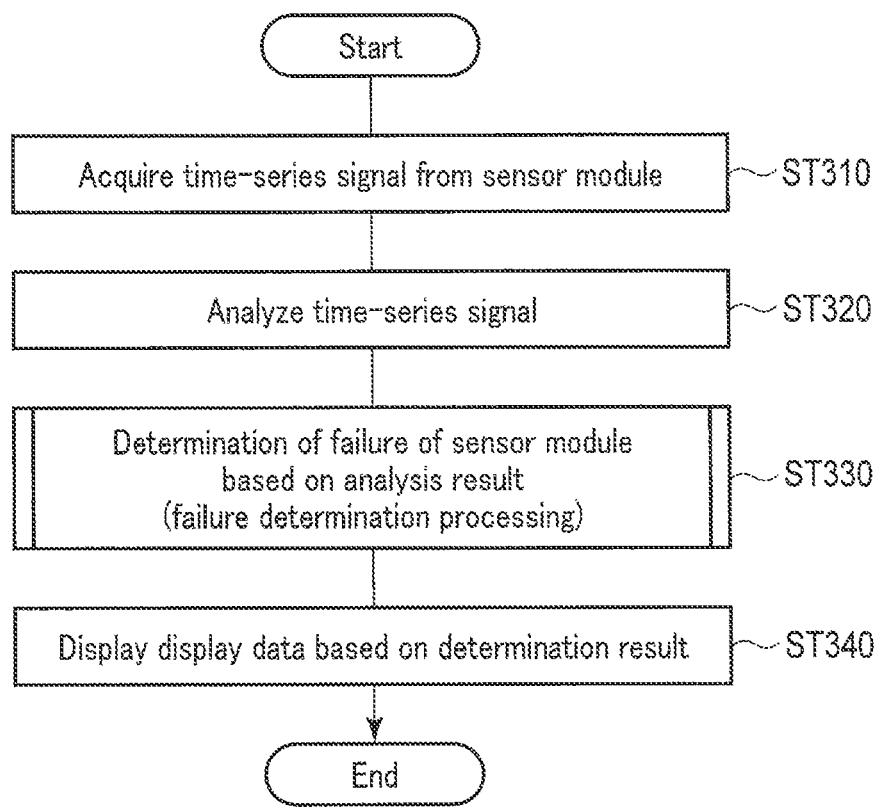
FIG. 3 is a flowchart exemplarily showing the operation of the failure detection apparatus in FIG. 1.

FIG. 3 is a flowchart exemplarily showing the operation of the failure detection apparatus 100 in FIG. 1. The processing in the flowchart of FIG. 3 starts when the user executes the failure detection program.

(Step ST310)

When the failure detection program is executed, the time-series signal acquisition unit 110 acquires a time-series signal from the sensor module 200.

(Step ST320)

After the acquisition of the time-series signal, the signal analysis unit 120 analyzes the time-series signal. More specifically, the signal analysis unit 120 generates an analysis result including at least information concerning the consecutive saturation count of the time-series signal and information concerning the amplitude saturation frequency of the time-series signal.

(Step ST330)

After the generation of the analysis result, the sensor state determination unit 130 determines the failure of the sensor module 200 based on the analysis result. The processing in step ST330 will be referred to as "failure determination processing" hereinafter. A specific example of failure determination processing will be described with reference to the flowchart of FIG. 4.

Figure 4:
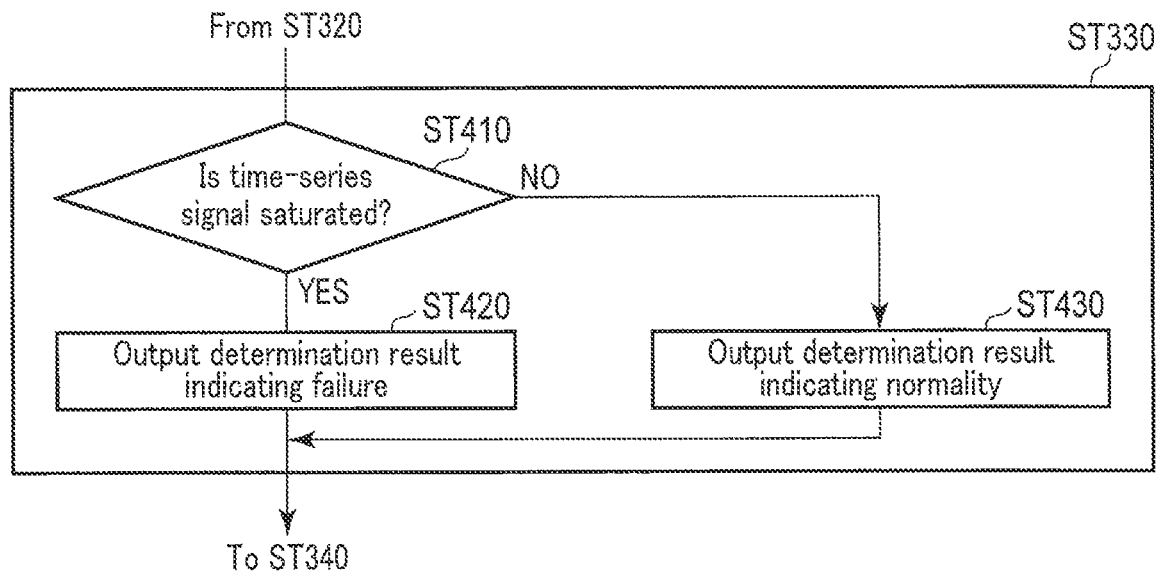
FIG. 4 is a flowchart exemplarily showing failure determination processing in FIG. 3.

FIG. 4 is a flowchart exemplarily showing the failure determination processing in the flowchart of FIG. 3. The flowchart of FIG. 4 corresponds to step ST330 in FIG. 3 and starts from step ST410.

(Step ST410)

After the generation of the analysis result, the sensor state determination unit 130 determines whether the time-series signal is saturated. If, for example, the analysis result includes information concerning a consecutive saturation count, the sensor state determination unit 130 determines whether the consecutive saturation count is equal to or more than a predetermined count. If the consecutive saturation count is equal to or more than the predetermined count, the process advances to step ST420; otherwise advances to step ST430. A specific example of determination based on a consecutive saturation count will be described with reference to FIGS. 5 and 6.

Figure 5:
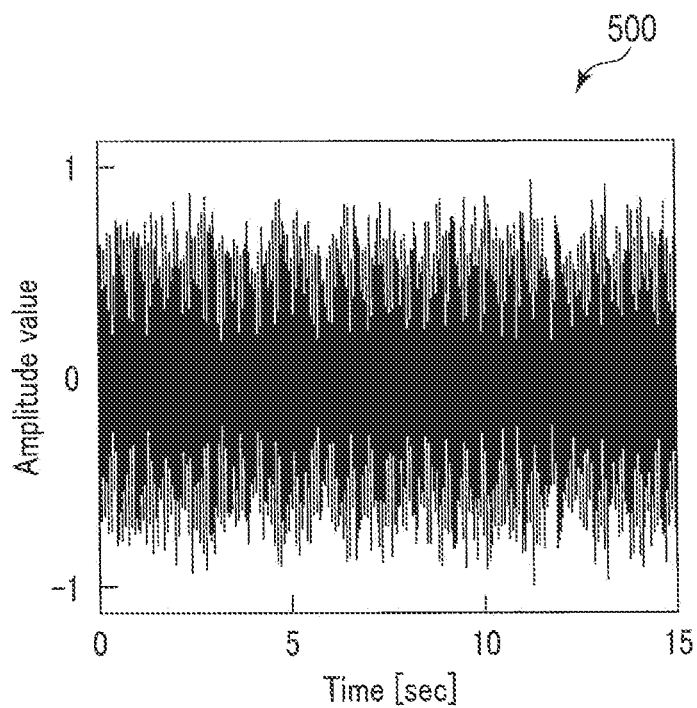
FIG. 5 is a view exemplarily showing a time-series signal according to the first embodiment.

FIG. 5 exemplarily shows a time-series signal 500 in the first embodiment. The time-series signal 500 in FIG. 5 exhibits a waveform for 15 sec. Assume that in the following description, the time-series signal 500 includes consecutively saturated samples.

Figure 6:
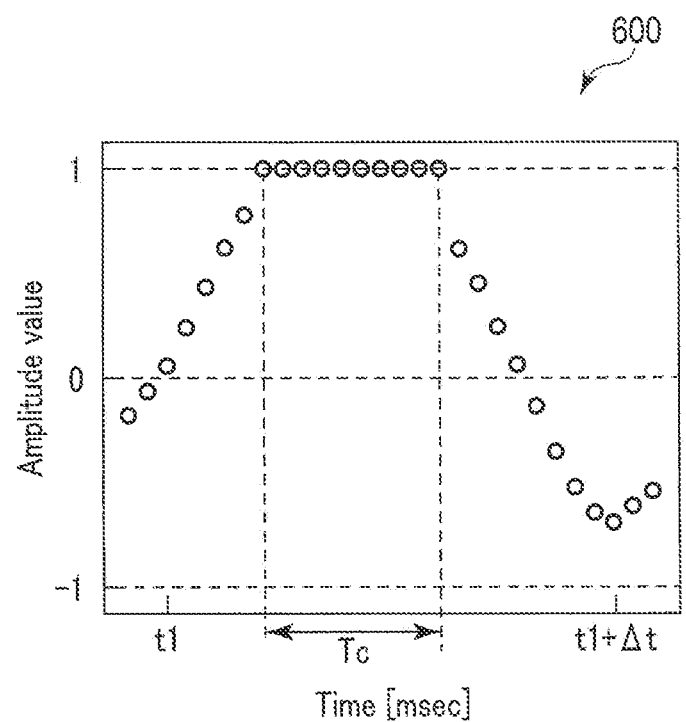
FIG. 6 is a graph exemplarily showing the saturation of a time-series signal according to the first embodiment.

FIG. 6 exemplarily shows the saturation of a time-series signal 600 in the first embodiment. The time-series signal 600 in FIG. 6 is obtained by extracting a component from the time-series signal 500 in FIG. 5 in the interval from time t1 to time t1+Δt. In this case, if the time-series signal 500 has been AD-converted with a sampling frequency of 96 kHz, time length Δt=0.25 msec corresponds to 24 samples of the time-series signal. The time-series signal 600 includes 10 samples (in the range of a time length Tc in FIG. 6) consecutively exhibiting the amplitude value "1" for the time length Δt.

For example, the sensor state determination unit 130 determines whether the time-series signal AD-converted with a sampling frequency of 96 kHz exhibits a consecutive saturation count equal to or more than 10 samples. This determination condition may be changed in accordance with a sampling frequency. If, for example, the sampling frequency is 48 kHz, the determination condition may be that "consecutive saturation count is five samples or more". Note that a consecutive saturation count may be arbitrarily determined in accordance with the performance of the sensor module 200 or set parameters. In addition, a consecutive saturation count is synonymous with a time length during which saturation continues, and hence may be replaced with a consecutive saturation time.

In addition, for example, if an analysis result includes information concerning an amplitude saturation frequency, the sensor state determination unit 130 determines whether the amplitude saturation frequency is equal to or more than a predetermined frequency. If the amplitude saturation frequency is equal to or more than the predetermined frequency, the process advances to step ST420; otherwise advances to step ST430. A specific example of determination based on an amplitude saturation frequency will be described with reference to FIG. 7.

Figure 7:
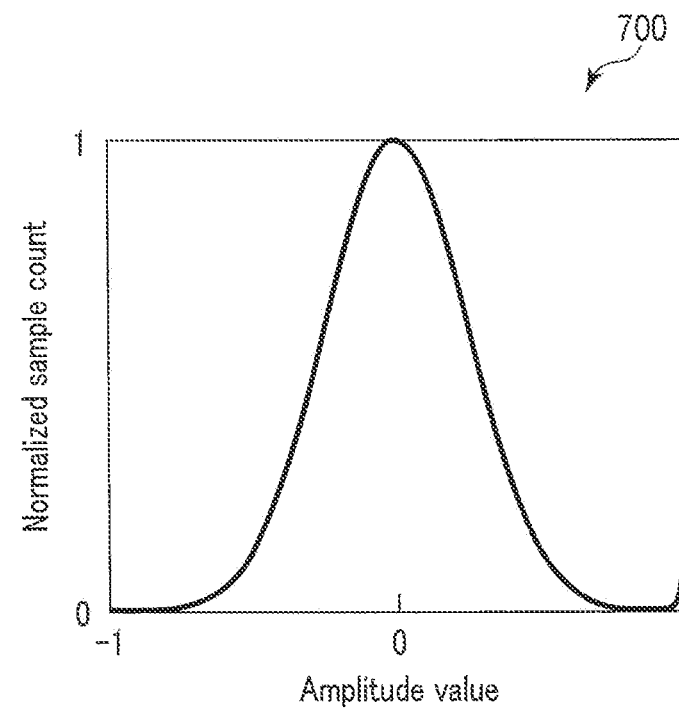
FIG. 7 is a graph exemplarily showing the amplitude histogram of a time-series signal according to the first embodiment.

FIG. 7 exemplarily shows an amplitude histogram 700 of a time-series signal in the first embodiment. The amplitude histogram 700 in FIG. 7 is obtained by representing the time-series signal 500 in FIG. 5 including consecutively saturated samples with normalized sample counts as a function of amplitude. A normalized sample count is a sample count obtained by normalization with the maximum value of actual sample counts corresponding to the respective amplitude values being set to "1". Accordingly, in an amplitude histogram, if the normalized sample count with the amplitude value "−1" or "1" is not zero, the time-series signal includes a sample whose amplitude value is saturated. Since the time-series signal 500 includes a sample whose amplitude value is saturated, the normalized sample count corresponding to the maximum amplitude value "1" in the amplitude histogram 700 is larger than zero.

For example, the sensor state determination unit 130 determines whether the number of samples whose amplitude values are saturated is equal to or more than a predetermined count in a time-series signal AD-converted with a sampling frequency of 96 kHz and having a predetermined time length (for example, 15 sec). Alternatively, the sensor state determination unit 130 may calculate the value of an amplitude saturation frequency from the value of a sampling frequency, the time length of a time-series signal, and the number of samples whose amplitude values are saturated and determine whether the calculated value is equal to or more than a threshold. Alternatively, using the amplitude histogram 700 in FIG. 7, the sensor state determination unit 130 may replace the value of an amplitude saturation frequency with a normalized sample count and determine whether a given signal is a time-series signal whose amplitude values are saturated.

(Step ST420)

Upon determining that the time-series signal is saturated, the sensor state determination unit 130 outputs a determination result indicating a failure. After step ST420, the process advances to step ST340 in FIG. 3.

(Step ST430)

Upon determining that the time-series signal is not saturated, the sensor state determination unit 130 outputs a determination result indicating normality. After step ST430, the process advances to step ST340 in FIG. 3.

(Step ST340)

Upon outputting the determination result, the sensor state determination unit 130 causes the display device 300 to display data based on the determination result. More specifically, if the determination result indicates normality, the sensor state determination unit 130 causes the display device 300 to display data indicating that the sensor module 200 is normal. In contrast to this, if the determination result indicates a failure, the sensor state determination unit 130 causes the display device 300 to display data indicating that the sensor module 200 is in failure. After step ST340, the processing based on the failure detection program is terminated.

Figure 8:
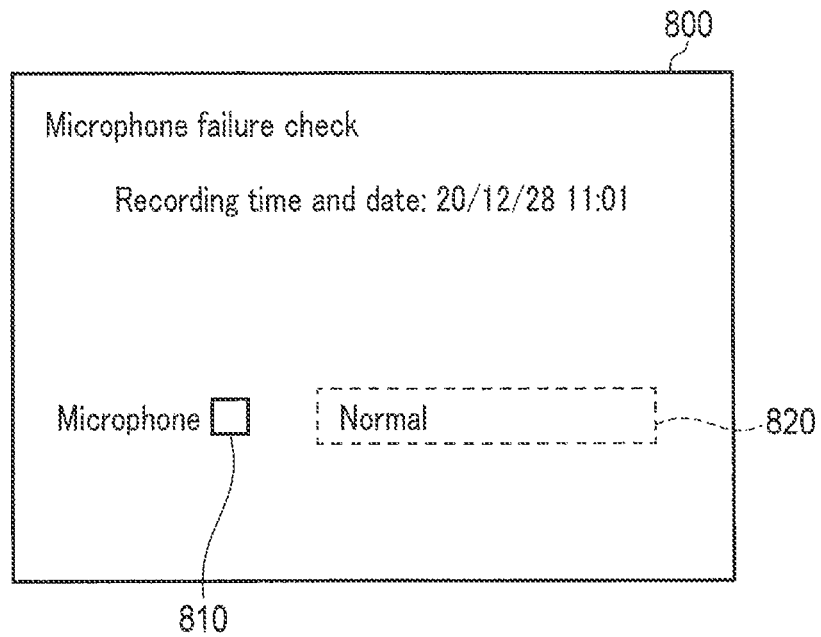
FIG. 8 is a view exemplarily showing display data in a normal case according to the first embodiment.
Figure 9:
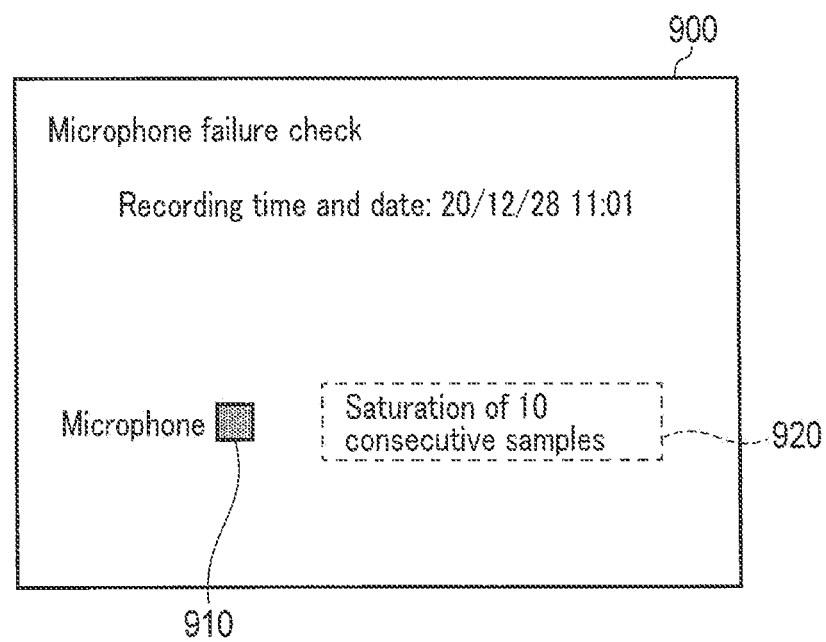
FIG. 9 is a view exemplarily showing display data concerning the failure of a sensor module according to the first embodiment.

A specific example of display data in the first embodiment will be described next with reference to FIGS. 8 and 9. The display data shown in FIGS. 8 and 9 are related to the sensor module 200 provided with a microphone sensor. These display data each include an indicator indicating whether the microphone sensor is in failure and a character string indicating whether recorded sound signal data is normal. Note that these display data each may include information concerning a communication situation with an external apparatus, information indicating the time and date when sound signal data as a time-series signal was recorded, information concerning the sound signal data (for example, information indicating a recording time, a bit depth, and a sampling frequency), and information indicating the current time. These equally apply to subsequent display data.

FIG. 8 exemplarily shows display data 800 in a normal case in the first embodiment. The display data 800 in FIG. 8 includes an indicator 810 and a character string display area 820. The indicator 810 is off. The character string "normal" is displayed in the character string display area 820. Visually checking the display data 800 allows the user to recognize that the microphone is normal.

FIG. 9 exemplarily shows display data 900 concerning the failure of the sensor module in the first embodiment. The display data 900 in FIG. 9 includes an indicator 910 and a character string display area 920. The indicator 910 is on. The character string "saturation of 10 consecutive samples" is displayed in the character string display area 920. Visually checking the display data 900 allows the user to recognize that the microphone is in failure and also recognize the reason for the determination.

As described above, the failure detection apparatus according to the first embodiment acquires a time-series signal generated by a sensor module, generates an analysis result including information concerning the saturation of the time-series signal by analyzing the time-series signal, and determines a failure in the sensor module based on the analysis result.

Accordingly, the failure detection apparatus according to the first embodiment can detect the failure of a sensor module having a high signal level by detecting the saturation of a time-series signal.

Second Embodiment

The first embodiment has exemplified the case in which the failure of a sensor module is detected by detecting the saturation of a time-series signal. In contrast to this, the second embodiment will exemplify a case in which the failure of a sensor module is detected further by detecting the amplitude change, silence, and amplitude level of a time-series signal.

Note that in the second embodiment, a sensor module and a display device constituting a failure detection system are similar to the sensor module 200 and the display device 300 of the failure detection system 1 according to the first embodiment. A description of the sensor module and the display device according to the second embodiment will be omitted.

FIG. 10 is a block diagram exemplarily showing the arrangement of a failure detection apparatus 100A according to the second embodiment. The failure detection apparatus 100A in FIG. 10 includes a time-series signal acquisition unit 110A (acquisition unit), a signal analysis unit 120A (analysis unit), and a sensor state determination unit 130A (determination unit). Note that since the time-series signal acquisition unit 110A has an arrangement similar to that of the time-series signal acquisition unit 110 in FIG. 1, a description of the arrangement will be omitted.

The signal analysis unit 120A receives a time-series signal from the time-series signal acquisition unit 110A. The signal analysis unit 120A generates an analysis result including at least information concerning the saturation of the time-series signal by analyzing the time-series signal. The signal analysis unit 120A outputs the analysis result to the sensor state determination unit 130A. Note that the signal analysis unit 120A may analyze the time-series signal in real time.

More specifically, the signal analysis unit 120A includes an amplitude saturation detection unit 1010, an amplitude change detection unit 1020, a no amplitude detection unit 1030, and an amplitude level detection unit 1040.

The amplitude saturation detection unit 1010 generates at least one of information concerning a consecutive saturation count and information concerning an amplitude saturation frequency by analyzing a time-series signal.

The amplitude change detection unit 1020 generates information concerning the number of times (amplitude change count) a steep change has occurred between adjacent samples of the samples included in a time-series signal. More specifically, the amplitude change detection unit 1020 counts by "1" as an amplitude change count when the amplitude of one sample of adjacent samples is "1" (or near "1") and the amplitude value of the other sample is "−1" (or near "−1").

The no amplitude detection unit 1030 generates information concerning a time-series signal in a period in which the amplitude value is zero, that is, a period of no amplitude (no amplitude period). More specifically, the no amplitude detection unit 1030 measures a no amplitude period in the acquired time-series signal.

The amplitude level detection unit 1040 generates amplitude level information indicating the maximum amplitude value and the minimum amplitude value of a time-series signal. More specifically, the amplitude level detection unit 1040 measures the amplitude level of the acquired time-series signal. Note that the amplitude level detection unit 1040 may measure the amplitude level of ambient noise in advance and hold the measured level as a noise amplitude level.

Generally stated, the signal analysis unit 120A generates an analysis result including at least one of information concerning a consecutive saturation count and information concerning an amplitude saturation frequency, information concerning an amplitude change count, information concerning a no amplitude period, and information concerning an amplitude level.

The sensor state determination unit 130A receives the analysis result from the signal analysis unit 120A. The sensor state determination unit 130A determines the failure of a sensor module 200 based on the analysis result. More specifically, if the consecutive saturation count included in the analysis result is equal to or more than a predetermined count, the sensor state determination unit 130A outputs a determination result indicating a failure; otherwise makes another determination. Alternatively, if the amplitude saturation frequency included in the analysis result is equal to or more than a predetermined frequency, the sensor state determination unit 130A outputs a determination result indicating a failure; otherwise makes another determination.

Note that "another determination" is, for example, determination using the amplitude change count, no amplitude period, or amplitude level included in an analysis result. More specifically, if the amplitude change count included in an analysis result is equal to or more than a predetermined count, the sensor state determination unit 130A outputs a determination result indicating a failure. If the no amplitude period included in an analysis result is equal to or more than a predetermined period, the sensor state determination unit 130A outputs a determination result indicating a failure. If the amplitude level included in an analysis result falls within a predetermined range, the sensor state determination unit 130A outputs a determination result indicating a failure.

The arrangement of the failure detection apparatus 100A according to the second embodiment has been described above. The operation of the failure detection apparatus 100A will be described with reference to the flowchart of FIG. 3 and the flowchart of FIG. 11. In the operation of the failure detection apparatus 100A, the processing (failure determination processing) in step ST330 in FIG. 3 is replaced with the failure determination processing in step ST1100 in FIG. 11. Accordingly, after step ST320, the process shifts to step ST1100 and then shifts to step ST340. Note that since the processing in steps ST310, ST320, and ST340 executed by the failure detection apparatus 100A is almost the same as that executed by the failure detection apparatus 100, a redundant description will be omitted, and different portions will be described as needed.

Figure 11:
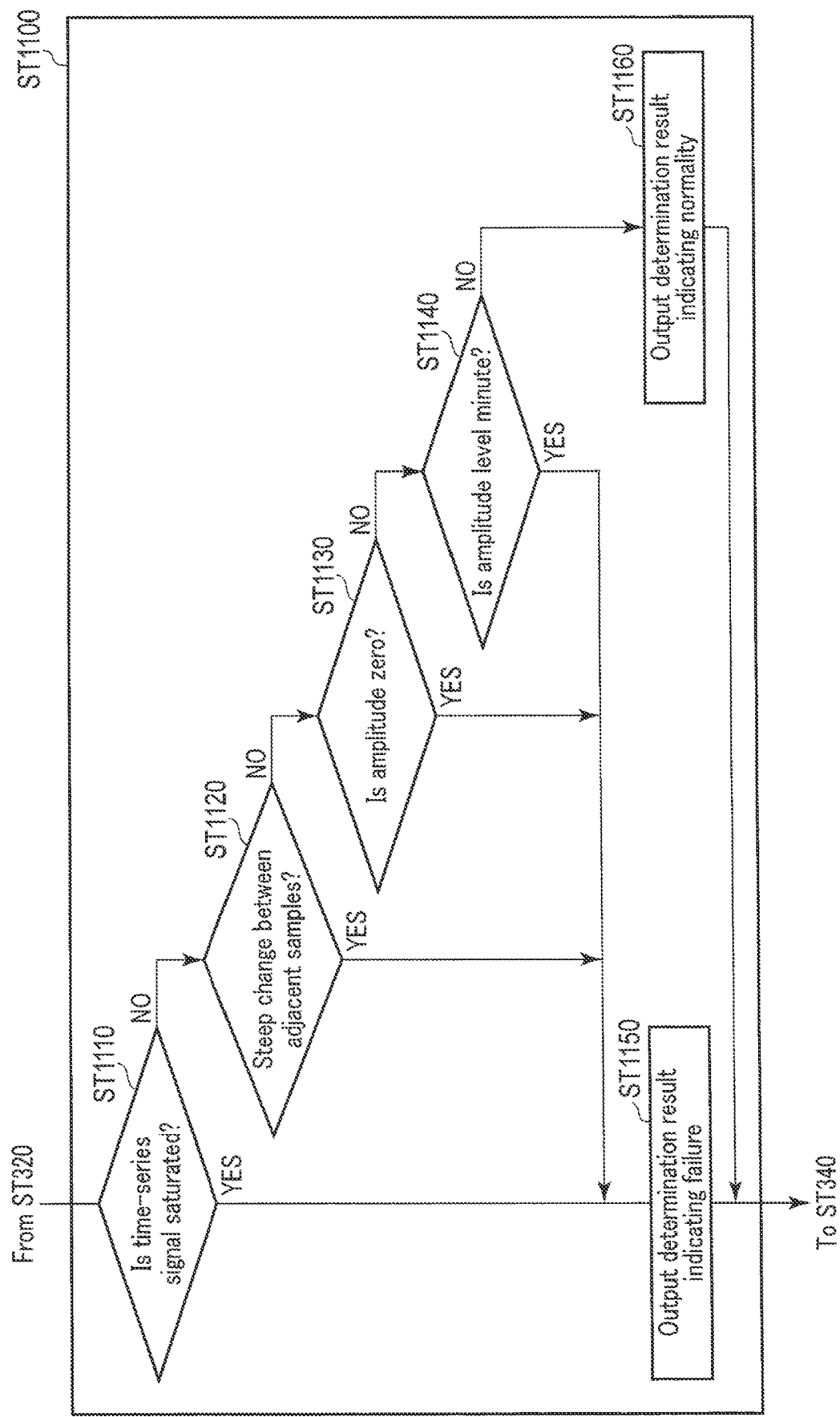
FIG. 11 is a flowchart exemplarily showing failure determination processing according to the second embodiment.

FIG. 11 is a flowchart exemplarily showing failure determination processing in the second embodiment. According to the flowchart of FIG. 11, the process makes a transition from step ST320 in FIG. 3 to start from step ST1110. Assume that in the operation of the failure detection apparatus 100A, the signal analysis unit 120A has generated an analysis result including at least one of information concerning a consecutive saturation count and information concerning an amplitude saturation frequency, information concerning an amplitude change count, information concerning no amplitude period, and information concerning an amplitude level in step ST320 before the transition.

(Step ST1110)

After the generation of the analysis result, the sensor state determination unit 130A determines whether the time-series signal is saturated. For example, if the analysis result includes information concerning a consecutive saturation count, the sensor state determination unit 130A determines whether the consecutive saturation count is equal to or more than a predetermined count. If the consecutive saturation count is equal to or more than the predetermined count, the process advances to step ST1150: otherwise advances to step ST1120.

If, for example, the analysis result includes information concerning an amplitude saturation frequency, the sensor state determination unit 130A determines whether the amplitude saturation frequency is equal to or more than a predetermined frequency. If the amplitude saturation frequency is equal to or more than the predetermined frequency, the process advances to step ST1150; otherwise advances to step ST1120.

(Step ST1120)

Upon determining that the time-series signal is not saturated, the sensor state determination unit 130A determines whether if there is a steep change between adjacent samples. More specifically, the sensor state determination unit 130A determines whether the amplitude change count included in the analysis result is equal to or more than a predetermined count. If the amplitude change count is equal to or more than the predetermined count, that is, there is a steep change between adjacent samples, the process advances to step ST1150; otherwise advances to step ST1130. A specific example of determination based on an amplitude change count will be described with reference to FIGS. 5 and 12. Assume that in the following description, the time-series signal 500 in FIG. 5 includes a sample whose amplitude has changed.

FIG. 12 exemplarily shows steep changes in a time-series signal 1200 in the second embodiment. The time-series signal 1200 in FIG. 12 is obtained by extracting a component from the time-series signal 500 in FIG. 5 in the interval from time t2 to time t2+Δt. Assuming that the time-series signal 500 has been AD-converted with a sampling frequency of 96 kHz, time length Δt=0.25 msec corresponds to 24 samples. The time-series signal 1200 includes 10 samples whose amplitude values are saturated in the time length Δt. These 10 samples respectively correspond to samples s1 to s10.

The samples s1 and s2 are adjacent samples. The sample s1 exhibits the amplitude value "1", and the sample s2 exhibits the amplitude value "−1". The samples s3 and s4 are adjacent samples. The sample s3 exhibits the amplitude value "−1", and the sample s4 exhibits the amplitude value "1". Likewise, the samples s5 and s6, the samples s7 and s8, and the samples s9 and s10 are all adjacent samples. One of each adjacent pair of samples exhibits the amplitude value "1", and the other sample exhibits the amplitude value "−1". Accordingly, in the time-series signal 1200, the amplitude change count is "5" in the time length Δt.

For example, the sensor state determination unit 130A determines whether the amplitude change count of 20 consecutive samples of the time-series signal sampled with a sampling frequency of 96 kHz is equal to or more than five. This determination condition may be changed in accordance with a sampling frequency. Note that an amplitude change count may be arbitrarily determined in accordance with the performance of the sensor module 200 or a set parameter.

FIG. 13 exemplarily shows an amplitude histogram 1300 of a time-series signal in the second embodiment. The amplitude histogram 1300 in FIG. 13 is obtained by representing the time-series signal 500 in FIG. 5 including samples whose amplitudes have changed with a normalized sample count corresponding to amplitude values. Since the time-series signal 500 includes samples whose amplitudes have changed, the normalized sample count of the amplitude histogram 1300 which corresponds to the maximum amplitude value "1" and the minimum amplitude value "−1" is larger than zero. For example, the sensor state determination unit 130A may perform determination by replacing an amplitude change count with a normalized sample count by using the amplitude histogram 1300.

(Step ST1130)

Upon determining that there is no steep change between adjacent samples, the sensor state determination unit 130A determines whether the amplitude value is zero. More specifically, the sensor state determination unit 130A determines whether the no amplitude period included in an analysis result is equal to or more than a predetermined period. If the no amplitude period is equal to or more than the predetermined period, that is, the amplitude value is zero, the process advances to step ST1150; otherwise advances to step ST1140. A specific example of determination based on a no amplitude period will be described with reference to FIG. 14.

Figure 14:
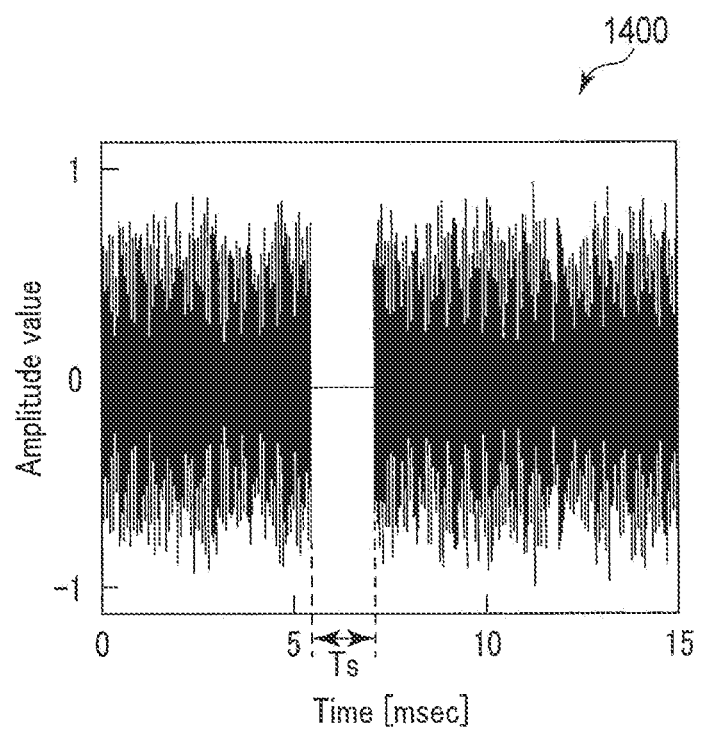
FIG. 14 is a graph exemplarily showing a time-series signal including a silent state according to the second embodiment.

FIG. 14 exemplarily shows a time-series signal 1400 including a silent state in the second embodiment. The time-series signal 1400 in FIG. 14 exhibits a waveform for 15 sec. The time-series signal 1400 includes a no amplitude period with a time length Ts.

For example, the sensor state determination unit 130A determines whether the no amplitude period of the time-series signal is equal to or more than 500 msec. Accordingly, if the time length Ts is equal to or more than 500 msec, the sensor state determination unit 130A determines that the sensor module 200 is in failure. This determination condition may be arbitrarily determined in accordance with the performance of the sensor module 200 or a set parameter.

(Step ST1140)

Upon determining that the amplitude value is not zero, the sensor state determination unit 130A determines whether the amplitude level is minute. More specifically, the sensor state determination unit 130A determines whether the amplitude level included in the analysis result falls within a predetermined range. If the amplitude level falls within the predetermined range, that is, the amplitude level is minute, the process advances to step ST1150; otherwise advances to step ST1160. A specific example of determination based on an amplitude level will be described with reference to FIG. 15.

Figure 15:
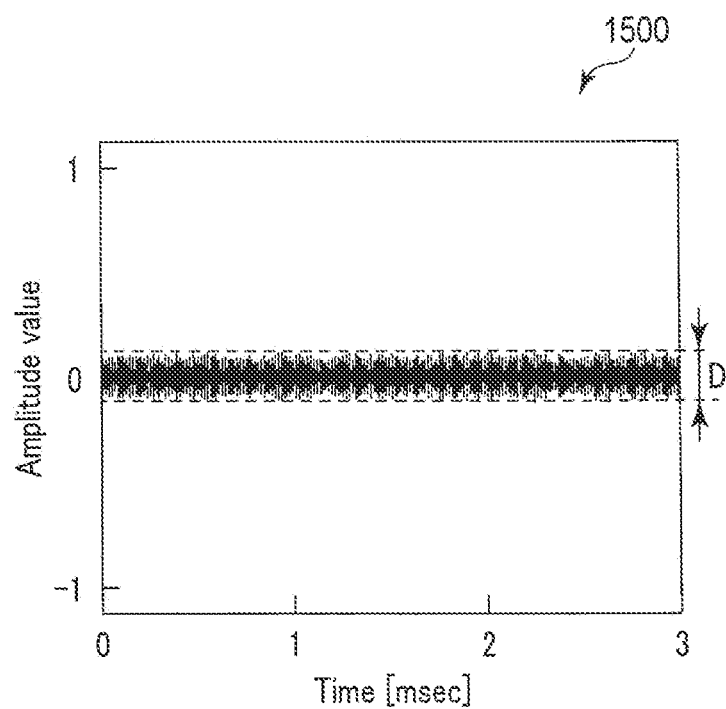
FIG. 15 is a graph exemplarily showing a time-series signal with a low amplitude level according to the second embodiment.

FIG. 15 exemplarily shows a time-series signal 1500 with a minute amplitude level in the second embodiment. The time-series signal 1500 in FIG. 15 exhibits a waveform for 3 min. The time-series signal 1500 has an amplitude level falling in an amplitude range D.

For example, the sensor state determination unit 130A determines whether the amplitude level of a time-series signal falls within an amplitude range from the amplitude value "−0.1" to the amplitude level "0.1". If the amplitude range D is an amplitude range from the amplitude value "−0.1" to the amplitude value "0.1", the sensor state determination unit 130A determines that the sensor module 200 is in failure. This determination condition may be arbitrarily determined in accordance with the performance of the sensor module 200 or a set parameter.

(Step ST1150)

The sensor state determination unit 130A outputs a determination result indicating a failure upon determining in step ST1110 that the time-series signal is saturated, upon determining in step ST1120 that there is a steep change between adjacent samples, upon determining in step ST1130 that the amplitude value is zero, or upon determining in step ST1140 that the amplitude level is minute. After step ST1120, the process advances to step ST340 in FIG. 3.

(Step ST1160)

Upon determining in step ST1140 that the amplitude level is not minute, the sensor state determination unit 130A outputs a determination result indicating normality. After step ST1160, the process advances to step ST340 in FIG. 3.

Note that the processing from step ST1120 to step ST1140 may be performed such that the execution order is changed or some or all of the steps may be concurrently performed.

A specific example of display data in the second embodiment will be described next with reference to FIGS. 16 and 17. The display data in FIGS. 16 and 17 each concern the sensor module 200 provided with a microphone sensor. These display data each include four indicators indicating what has caused a failure in the microphone sensor and four character strings indicating whether recorded sound signal data is normal. Combinations of the four indicators and the four character strings respectively correspond to determination concerning amplitude saturation, determination concerning an amplitude change, determination concerning no amplitude (silence), and determination concerning an amplitude level.

FIG. 16 exemplarily shows display data 1600 in a normal case in the second embodiment. The display data 1600 in FIG. 16 includes four indicators 1611 to 1613 and four character string display areas 1621 to 1624. The four indicators 1611 to 1613 are all off. The character string "normal" is displayed in each of the four character string display areas 1621 to 1624. Visually checking the display data 1600 allows the user to recognize that the microphone is normal.

FIG. 17 exemplarily shows display data 1700 concerning the failure of the sensor module in the second embodiment. The display data 1700 in FIG. 17 includes four indicators 1711 to 1714 and four character string display areas 1721 to 1724. The indicator 1711 is on. The character string "saturation of 10 consecutive samples" is displayed in the character string display area 1721. The three indicators 1712 to 1714 are all off. The character string "normal" is display in each of the three character string display areas 1722 to 1724. Visually checking the display data 1700 allows the user to recognize that the microphone is in failure and to also recognize the reason for the determination.

As described above, the failure detection apparatus according to the second embodiment acquires a time-series signal generated by a sensor module, generates an analysis result including information concerning the saturation of the time-series signal by analyzing the time-series signal, and determines a failure concerning the sensor module based on the analysis result. In addition, this failure detection apparatus can perform failure determination by using information concerning an amplitude change count concerning a time-series signal, information concerning a no amplitude period, and information concerning an amplitude level.

Therefore, the failure detection apparatus according to the second embodiment can detect the failure of the sensor module using a different type of detection means in addition to detecting the saturation of a time-series signal.

Third Embodiment

The first and second embodiments each have exemplified the case in which the failure of a sensor module is detected. In contrast to this, the third embodiment will exemplify a case in which the failure of a sensor module is inspected by changing a parameter of the sensor module.

Figure 18:
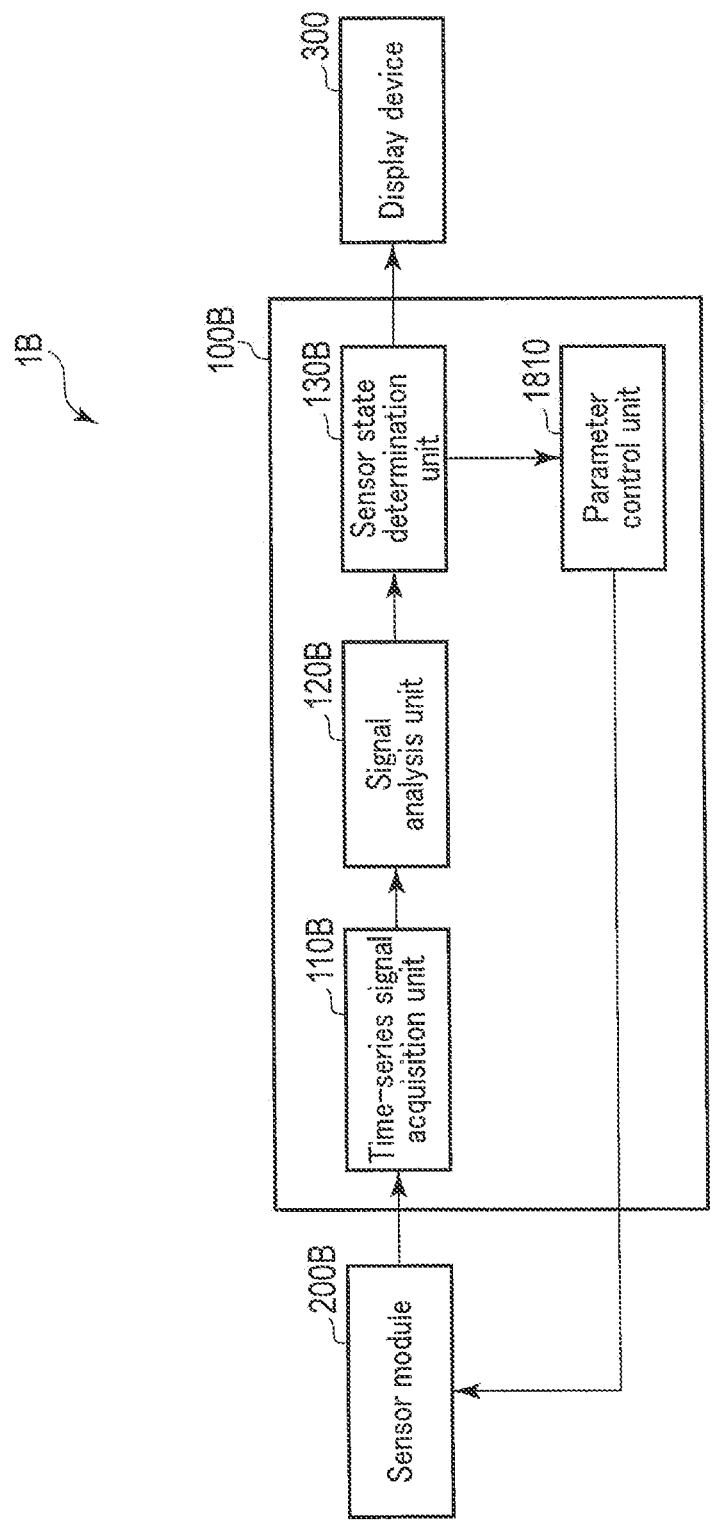
FIG. 18 is a block diagram exemplarily showing the arrangement of a failure detection system including a failure detection apparatus according to the third embodiment.

FIG. 18 is a block diagram exemplarily showing the arrangement of a failure detection system 1B including a failure detection apparatus 100B according to the third embodiment. The failure detection system 1B in FIG. 18 includes the failure detection apparatus 100B, a sensor module 200B, and a display device 300. The sensor module 200B has a function similar to that of the sensor module 200 in FIG. 1 and also has a function of accepting a change in parameter from the failure detection apparatus 100B. Note that the failure detection system 1B may include a plurality of sensor modules. In this case, the failure detection apparatus 100B determines the state of each of the plurality of sensor modules.

The failure detection apparatus 100B includes a time-series signal acquisition unit 110B, a signal analysis unit 120B, a sensor state determination unit 130B, and a parameter control unit 1810 (control unit). Note that the time-series signal acquisition unit 110B, the signal analysis unit 120B, and the sensor state determination unit 130B respectively have arrangements almost similar to those of the time-series signal acquisition unit 110, the signal analysis unit 120, and the sensor state determination unit 130 in FIG. 1 or to those of the time-series signal acquisition unit 110A, the signal analysis unit 120A, and the sensor state determination unit 130A in FIG. 10, and hence a redundant description will be omitted, and different portions will be described as needed.

The sensor state determination unit 130B outputs a determination result to the display device 300 and further outputs the result to the parameter control unit 1810.

The parameter control unit 1810 receives a determination result from the sensor state determination unit 130B. The parameter control unit 1810 changes parameters of the sensor module 200B in accordance with the determination result. The parameters are, for example, the gain of an amplifier and parameters for AD conversion (a bit depth and a sampling frequency). The parameter control unit 1810 holds, for example, a plurality of parameters concerning the sensor module 200B and changes some or all of the plurality of parameters of the sensor module 200B. Note that the parameter control unit 1810 may determine whether all the parameters of the sensor module 200B have been changed.

The sensor module 200B accepts a change in parameter from the parameter control unit 1810. The sensor module 200B generates sensor data (time-series signal) based on the changed parameter. The sensor module 200B outputs the generated time-series signal to the failure detection apparatus 100B. Note that the arrangement of the sensor module 200B is similar to that of the sensor module 200 in FIG. 2.

FIG. 19 is a flowchart exemplarily showing the operation of the failure detection apparatus in FIG. 18. The processing in the flowchart of FIG. 19 starts when the user executes a failure inspection program.

(Step ST1910)
When the failure inspection program is executed, the parameter control unit 1810 changes a parameter of the sensor module 200B. Note that when the process makes a transition from the step ST1950 to be described later, the parameter control unit 1810 newly changes a parameter of the sensor module 200B.

(Step ST1920)
After the parameter is changed, the time-series signal acquisition unit 110B acquires a time-series signal from the sensor module 200B.

(Step ST1930)
After the time-series signal is acquired, the signal analysis unit 120B generates an analysis result including at least information concerning the saturation of the time-series signal by analyzing the time-series signal.

(Step ST1940)
After the analysis result is generated, the sensor state determination unit 130B determines the failure of the sensor module 200B based on the analysis result. The processing in step ST1940 will be referred to as "failure determination processing" hereinafter. A specific example of failure determination processing is similar to that in the flowchart of FIG. 4 or the flowchart of FIG. 11.

(Step ST1950)
After the determination result is output, the parameter control unit 1810 determines whether failure determination has been executed with all parameters. More specifically, the parameter control unit 1810 determines whether all the parameters of the sensor module 200B have been changed. If there is no need to change any parameter, that is, failure determination has been executed with all the parameters, the process advances to step ST1960; otherwise returns to step ST1910.

(Step ST1960)
After failure determination is executed with all the parameters, the sensor state determination unit 130B causes the display device 300 to display data based on all the determination results. More specifically, the sensor state determination unit 130B displays display data associating the respective parameters with the determination results. After step ST1960, the processing of the failure inspection program is terminated.

As described above, the failure detection apparatus according to the third embodiment acquires a time-series signal generated by a sensor module, generates an analysis result including information concerning the saturation of the time-series signal by analyzing the time-series signal, and determines a failure concerning the sensor module based on the analysis result. This failure detection apparatus can also change a parameter of the sensor module upon determining the failure of the sensor module and further determine the failure of the sensor module with the changed parameter. This apparatus can specify a failure cause at a specific location in the sensor module.

Accordingly, the failure detection apparatus according to the third embodiment can perform failure determination concerning a time-series signal generated by a sensor module whose parameter has been changed, and hence can inspect and specify a failure cause.

Fourth Embodiment

The first, second, and third embodiments each have exemplified the failure detection apparatus. In contrast to this, the fourth embodiment will exemplify a state monitoring apparatus including the respective components of the failure detection apparatus.

FIG. 20 is a block diagram exemplarily showing the arrangement of a state monitoring system 2 including a state monitoring apparatus 2000 according to the fourth embodiment. The state monitoring system 2 in FIG. 20 includes the state monitoring apparatus 2000, a sensor module 200, and a display device 300. The state monitoring apparatus 2000 determines the state of the sensor module 200 based on sensor data and further determines the state (normal or abnormal) of a measurement target (monitoring target). The display device 300 displays display data based on determination made by the state monitoring apparatus 2000.

The state monitoring apparatus 2000 includes a failure detection apparatus 100C, a monitoring target abnormality detection unit 2010 (abnormality detection unit), and a communication unit 2020. The failure detection apparatus 100C includes a time-series signal acquisition unit 110C, a signal analysis unit 120C, and a sensor state determination unit 130C. Note that since the failure detection apparatus 100C has an arrangement almost similar to that of the failure detection apparatus 100 in FIG. 1 or the failure detection apparatus 100A in FIG. 10, a redundant description will be omitted, and different portions will be described as needed.

The time-series signal acquisition unit 110C outputs a time-series signal to the signal analysis unit 120C and further outputs the signal to the monitoring target abnormality detection unit 2010. The sensor state determination unit 130C outputs a determination result to the display device 300 and further outputs the determination result to the communication unit 2020.

The monitoring target abnormality detection unit 2010 monitors the operation state of a measurement target to detect the malfunction, malfunction symptom, deterioration, deterioration symptom, and the like of the measurement target as abnormalities or detect a defect, trouble, and the like in a product and a workpiece manufactured and processed by the measurement target as abnormalities. The monitoring target abnormality detection unit 2010 receives a time-series signal from the time-series signal acquisition unit 110C. The monitoring target abnormality detection unit 2010 monitors based on the time-series signal whether a monitoring target has an abnormality and generates an abnormality detection result when the measurement target has an abnormality. The abnormality detection result includes, for example, information (deterioration information) concerning the deterioration of a monitoring target and information (abnormality information) concerning an abnormality in the monitoring target. The monitoring target abnormality detection unit 2010 outputs the abnormality detection result to the display device 300 and the communication unit 2020.

More specifically, the monitoring target abnormality detection unit 2010 generates deterioration information in accordance with the increase rate of the power of the current high-frequency component to a high-frequency component (for example, 10 kHz or more, more specifically, between 15 kHz and 40 kHz) in a normal case (for example, at the early operation of the monitoring target) by frequency-analyzing the time-series signal. Note that the monitoring target abnormality detection unit 2010 may generate deterioration information by using a learned model based on machine learning which is learned to output deterioration information upon receiving a time-series signal.

In addition, the monitoring target abnormality detection unit 2010 generates first abnormality information in accordance with the increase rate of the power of the current low-frequency component to the power of a low-frequency component (for example, equal to or more than 10 kHz, more specifically, between 2 kHz and 3 kHz) in a normal case by frequency-analyzing the time-series signal. In addition, the monitoring target abnormality detection unit 2010 frequency-analyzes a time-series signal to generate second abnormality information when a waveform having a specific frequency (for example, between 10 kHz and 40 kHz) appears for a predetermined time length (for example, 10 msec) at predetermined time intervals (for example, 0.4-sec intervals). Note that the monitoring target abnormality detection unit 2010 may generate abnormality information by using a learned model based on machine learning which is learned to output deterioration information (first abnormality information and second abnormality information) upon receiving a time-series signal.

The communication unit 2020 receives an abnormality detection result from the monitoring target abnormality detection unit 2010 and receives a determination result from the sensor state determination unit 130C. The communication unit 2020 communicates with an external apparatus via a network NW. The external apparatus is, for example, another failure detection apparatus, another state monitoring apparatus, a portable terminal, or a cloud. The communication unit 2020 notifies the external apparatus of an abnormality detection result and a determination result.

The arrangements of the state monitoring system 2 and the state monitoring apparatus 2000 according to the fourth embodiment have been described above. The operation of the state monitoring apparatus 2000 will be described next with reference to the flowchart of FIG. 20.

Figure 21:
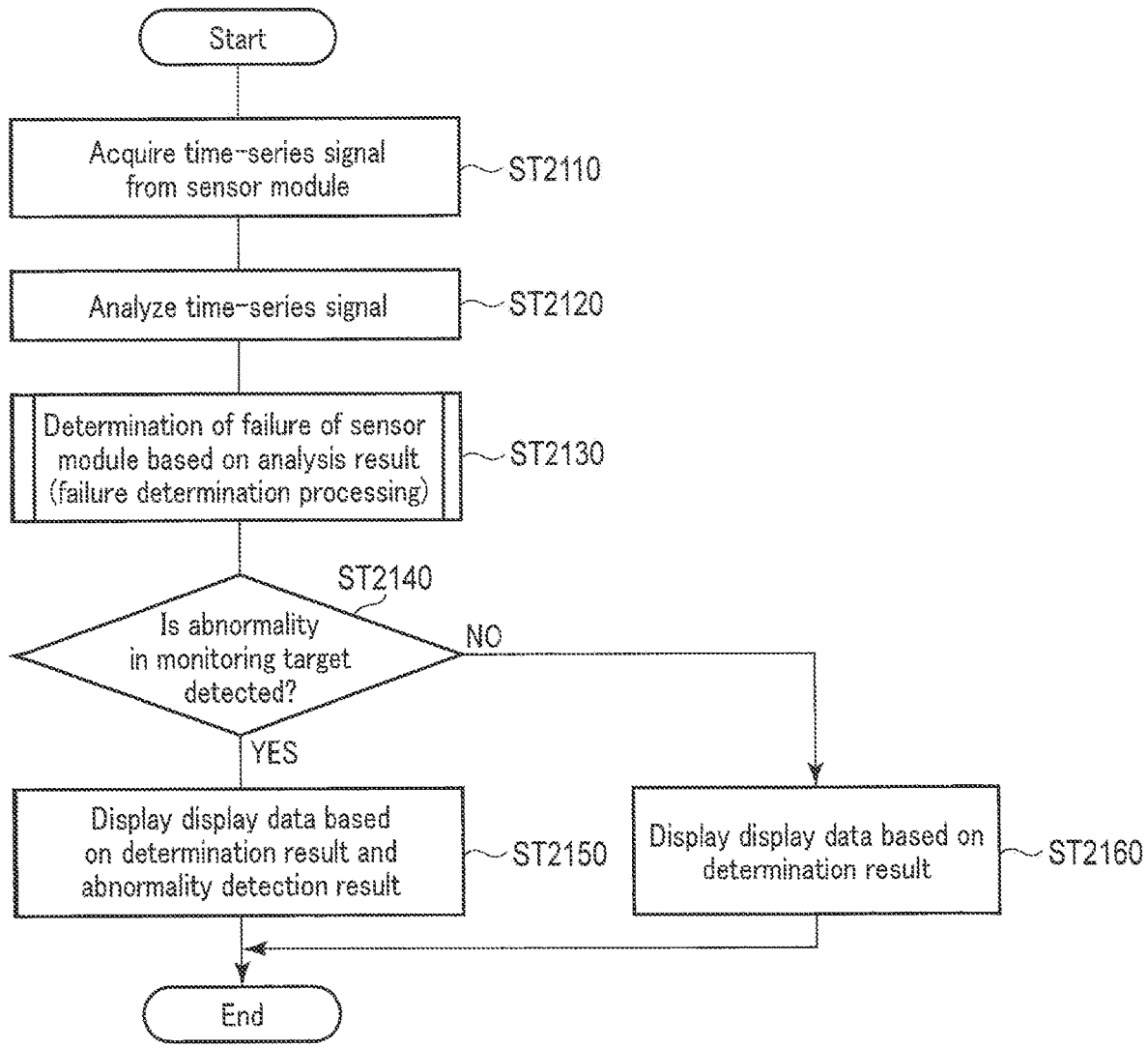
FIG. 21 is a flowchart exemplarily showing the operation of the state monitoring apparatus in FIG. 20.

FIG. 21 is a flowchart exemplarily showing the operation of the state monitoring apparatus in FIG. 20. The processing in the flowchart of FIG. 20 starts when the user executes the state monitoring program. The processing of the state monitoring program partly includes the processing of the failure detection program. More specifically, steps ST2110, ST2120, and ST2130 in FIG. 20 are similar to steps ST310, ST320, and ST330 in FIG. 3 (or step ST1100 in FIG. 11). Accordingly, a description of these steps will be omitted.

(Step ST2140)

After the determination result is output, the monitoring target abnormality detection unit 2010 determines whether an abnormality is detected in the monitoring target. More specifically, the monitoring target abnormality detection unit 2010 monitors based on the time-series signal whether there is an abnormality in the monitoring target. If there is an abnormality in the monitoring target, that is, an abnormality is detected in the monitoring target, the process advances to step ST2150; otherwise advances to step ST2160.

(Step ST2150)

After an abnormality is detected in the monitoring target, the sensor state determination unit 130C causes the display device 300 to display data based on the determination result. In addition, the monitoring target abnormality detection unit 2010 causes the display device 300 to display data based on the abnormality detection result. At this time, the communication unit 2020 may output the determination result and the abnormality detection result to an external apparatus. After step ST2150, the processing of the state monitoring program is terminated.

(Step ST2160)

If no abnormality is detected in the monitoring target, the sensor state determination unit 130C causes the display device 300 to display data based on the determination result. After step ST2160, the processing of the state monitoring program is terminated.

A specific example of display data in the fourth embodiment will be described with reference to FIGS. 22 to 24. The display data in FIGS. 22 to 24 each concern a cooling fan as a measurement target and the sensor module 200 provided with a microphone sensor. Each display data includes six indicators concerning the deterioration degree and abnormality of the cooling fan and four indicators indicating what has caused a failure in the microphone sensor. The four indicators respectively correspond to determination concerning amplitude saturation, determination concerning an amplitude change, determination concerning no amplitude (silence), and determination concerning an amplitude level.

Figure 22:
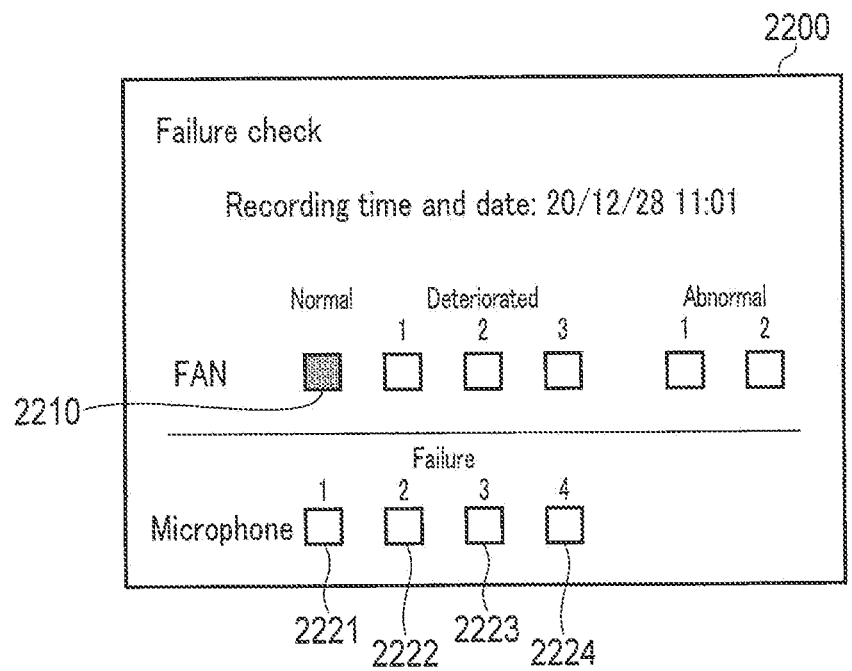
FIG. 22 is a view exemplarily showing display data in a normal case according to the fourth embodiment.

FIG. 22 exemplarily shows display data 2200 in a normal case in the fourth embodiment. The display data 2200 in FIG. 22 includes six indicators concerning the state of the cooling fan and including an indicator 2210 indicating whether the cooling fan is normal and four indicators 2221 to 2224 concerning the failure cause of the microphone. The indicator 2210 is on. All the other indicators are off. Visually checking the display data 2200 allows the user to recognize that both the cooling fan and the microphone are normal.

Figure 23:
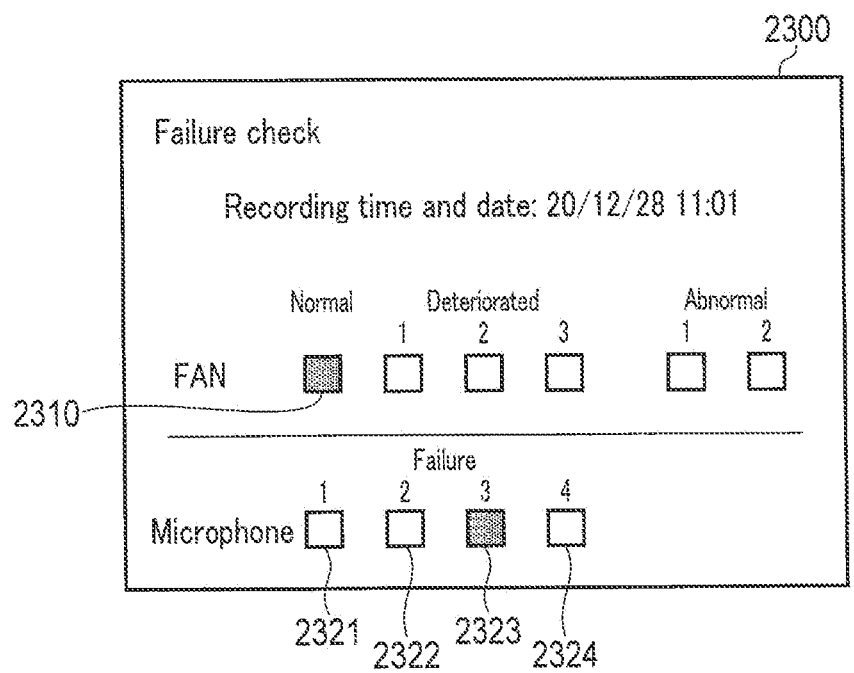
FIG. 23 is a view exemplarily showing display data concerning the failure of a sensor module according to the fourth embodiment.

FIG. 23 exemplarily shows display data 2300 concerning the failure of the sensor module in the fourth embodiment. The display data 2300 in FIG. 23 includes six indicators concerning the state of the cooling fan and including an indicator 2310 indicating whether the cooling fan is normal and four indicators 2321 to 2324 concerning the failure cause of the microphone. The indicator 2310 is on. The indicator 2323 concerning determination concerning silence is on. Visually checking the display data 2300 allows the user to recognize that at least the microphone is in failure.

FIG. 24 exemplarily shows display data 2400 concerning the failure of the sensor module and an abnormality in a monitoring target in the fourth embodiment. The display data 2400 in FIG. 24 includes six indicators concerning the state of the cooling fan and including an indicator 2411 indicating that the cooling fan has deteriorated and two indicators 2412 and 2413 concerning the abnormality of the cooling fan and four indicators 2421 to 2424 concerning the failure cause of the microphone. The indicators 2411, 2412, and 2413 are on. The indicator 2421 concerning determination concerning amplitude saturation is on. Visually checking the display data 2400 allows the user to recognize the abnormality of the cooling fan and the failure of the microphone.

As described above, the state monitoring apparatus according to the fourth embodiment acquires a time-series signal generated by a sensor module, generates an analysis result including information concerning the saturation of the time-series signal by analyzing the time-series signal, and determines a failure concerning the sensor module based on the analysis result. In addition, this failure detection apparatus can detect an abnormality in a measurement target concerning a time-series signal and notify an external apparatus of at least one of the failure of the sensor module and an abnormality in the measurement target.

Accordingly, the state monitoring apparatus according to the fourth embodiment can notify externally at least one of the state of the sensor module and the state of the measurement target, and hence can flexibly perform the maintenance and management of the measurement target.

Note that the state monitoring apparatus 2000 and the state monitoring system 2 according to the fourth embodiment may be respectively deemed as a failure detection apparatus and a failure detection system. That is, the failure detection apparatus according to the fourth embodiment includes the time-series signal acquisition unit 110C, the signal analysis unit 120C, the sensor state determination unit 130C, the monitoring target abnormality detection unit 2010, and the communication unit 2020. In addition, the failure detection system according to the fourth embodiment includes the above failure detection apparatus, the sensor module 200, and the display device 300.

OTHER EMBODIMENTS

In each of the first, second, third, and fourth embodiments, failure determination is performed when an amplitude value is saturated. However, this is not exhaustive. For example, thresholds may be set at a value (for example, 0.995) near the maximum value of the amplitude value and a value (for example, −0.995) near the minimum value, and failure determination may be performed when the amplitude value exceeds or fall short of the threshold.

FIG. 25 is a block diagram exemplarily showing the hardware arrangement of a computer 2500 according to an embodiment. The computer 2500 in FIG. 25 includes, as hardware, a CPU (Central Processing Unit) 2510, a RAM (Random Access Memory) 2520, a program memory 2530, an auxiliary storage device 2540, and an input/output interface 2550. The CPU 2510 communicates with the RAM 2520, the program memory 2530, the auxiliary storage device 2540, and the input/output interface 2550 via a bus 2560.

The CPU 2510 is an example of a general-purpose processor. The RAM 2520 is used as a working memory for the CPU 2510. The RAM 2520 includes a volatile memory such as an SDRAM (Synchronous Dynamic Random Access Memory). The program memory 2530 stores various types of programs including a failure detection program, a failure inspection program, and a state monitoring program. As the program memory 2530, for example, a ROM (Read-only Memory), part of the auxiliary storage device 2540, or their combination is used. The auxiliary storage device 2540 non-transitorily stores data. The auxiliary storage device 2540 includes non-volatile memory such as an HDD or SSD.

The input/output interface 2550 is an interface for connection or communication with other devices. The input/output interface 2550 is used for, for example, connection or communication with the sensor module 200 and the display device 300 shown in FIGS. 1, 18, and 20. In addition, the communication unit 2020 in FIG. 20 may be included in the input/output interface 2550.

Each program stored in the program memory 2530 includes computer-executable instructions. A program (computer-executable instructions) causes the CPU 2510 to execute predetermined processing when being executed by the CPU 2510. For example, the failure detection program causes the CPU 2510 to execute a series of processing described concerning each step in FIGS. 3, 4, and 11 when being executed by the CPU 2510. In addition, for example, the failure inspection program causes the CPU 2510 to execute a series of processing described concerning each step in FIG. 19 when being executed by the CPU 2510. Furthermore, for example, the state monitoring program causes the CPU 2510 to execute a series of processing described concerning each step in FIG. 21 when being executed by the CPU 2510.

The programs may be provided for the computer 2500 while being stored in a computer-readable storage medium. In this case, for example, the computer 2500 further includes a drive (not shown) for reading out data from the storage medium and acquires the program from the storage medium. Examples of the storage medium include a magnetic disk, an optical disk (a CD-ROM, CD-R, DVD-ROM, DVD-R, or the like), a magneto-optical disk (an MO or the like), and a semiconductor memory. Alternatively, the programs may be stored in a server on a communication network, and the computer 2500 may download the programs from the server by using the input/output interface 2550.

The processing described in each embodiment is not limited to being executed by causing a general-purpose hardware processor such as the CPU 2510 to execute the programs and may be executed by a dedicated hardware processor such as an ASIC (Application Specific Integrated Circuit). The term "processing circuitry (processing unit)" includes at least one general-purpose hardware processor, at least one dedicated hardware processor, and a combination of at least one general-purpose hardware processing and at least one dedicated hardware processor. In the case shown in FIG. 25, the CPU 2510, the RAM 2520, and the program memory 2530 correspond to processing circuits.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A failure detection apparatus comprising processing circuitry configured to:
   acquire a time-series signal generated by a sensor module;
   generate an analysis result including information of an amplitude saturation frequency as a frequency with which amplitude values of samples included in the time-series signal are saturated, by analyzing the time-series signal; and
   determine that the sensor module is in failure when the amplitude saturation frequency is not less than a predetermined frequency, based on the analysis result.

2. The apparatus according to claim 1, wherein the processing circuitry is further configured to:
   generate the analysis result further including information of a consecutive saturation count which is a number of times that the amplitude values of the samples included in the time-series signal are consecutively saturated; and
   determine that the sensor module is in failure when the consecutive saturation count is not less than a predetermined count.

3. The apparatus according to claim 1, wherein the processing circuitry is further configured to:
   generate the analysis result further including information of an amplitude change count which is a number of times that a steep change has occurred between adjacent samples included in the time-series signal; and
   determine that the sensor module is in failure when the amplitude change count is not less than a predetermined count.

4. The apparatus according to claim 1, wherein the processing circuitry is further configured to:
   generate the analysis result further including information of a no amplitude period as a period during which an amplitude value of a sample included in the time-series signal is zero; and
   determine that the sensor module is in failure when the no amplitude period is not less than a predetermined period.

5. The apparatus according to claim 1, wherein the processing circuitry is further configured to:
   generate the analysis result further including information of an amplitude level indicating a maximum amplitude value and a minimum amplitude value of the time-series signal; and
   determine that the sensor module is in failure when the amplitude level falls within a predetermined range.

6. The apparatus according to claim 1, wherein the processing circuitry is further configured to:
   change a parameter of the sensor module after it is determined that the sensor module is in failure; and
   further determine with respect to a changed parameter whether the sensor module is in failure.

7. The apparatus according to claim 6, wherein the parameter includes one of a gain, a bit depth, and a sampling frequency.

8. The apparatus according to claim 1, wherein the processing circuitry is further configured to:
   detect an abnormality in a measurement target concerning the time-series signal; and
   notify an external apparatus of at least one of a failure of the sensor module and an abnormality in the measurement target.

9. A failure detection method comprising:
   acquiring a time-series signal generated by a sensor module;
   generating an analysis result including information of an amplitude saturation frequency as a frequency with which amplitude values of samples included in the time-series signal are saturated, by analyzing the time-series signal; and
   determining that the sensor module is in failure when the amplitude saturation frequency is not less than a predetermined frequency, based on the analysis result.

10. A non-transitory computer-readable storage medium storing a program for causing a computer to execute processing comprising:
   acquiring a time-series signal generated by a sensor module;
   generating an analysis result including information of an amplitude saturation frequency as a frequency with which amplitude values of samples included in the time-series signal are saturated, by analyzing the time-series signal; and
   determining that the sensor module is in failure when the amplitude saturation frequency is not less than a predetermined frequency, based on the analysis result.

* * * * *